United States Patent
Fan et al.

(10) Patent No.: US 10,869,239 B2
(45) Date of Patent: Dec. 15, 2020

(54) MOBILITY FOR COVERAGE EXTENSION MODES IN WIRELESS COMMUNICATIONS

(71) Applicant: QUALCOMM Incorporated, San Diego, CA (US)

(72) Inventors: Zhifei Fan, San Diego, CA (US); Xiaoxia Zhang, San Diego, CA (US); Jing Sun, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/407,003

(22) Filed: May 8, 2019

(65) Prior Publication Data
US 2019/0349826 A1  Nov. 14, 2019

Related U.S. Application Data

(60) Provisional application No. 62/669,026, filed on May 9, 2018.

(51) Int. Cl.
*H04W 36/00* (2009.01)
*H04W 76/10* (2018.01)
(Continued)

(52) U.S. Cl.
CPC ..... *H04W 36/00835* (2018.08); *H04W 36/08* (2013.01); *H04W 74/0833* (2013.01); *H04W 76/10* (2018.02); *H04W 84/042* (2013.01)

(58) Field of Classification Search
CPC ....... H04W 36/00835; H04W 74/0833; H04W 36/08; H04W 76/10; H04W 84/042;
(Continued)

(56) References Cited

U.S. PATENT DOCUMENTS

| 2016/0286524 A1* | 9/2016 | Griot ....................... H04L 41/00 |
| 2017/0135005 A1* | 5/2017 | Basu Mallick ....... H04W 48/16 |
| 2018/0146410 A1* | 5/2018 | Cho .................. H04W 36/0061 |

FOREIGN PATENT DOCUMENTS

| WO | WO-2015116870 A1 | 8/2015 |
| WO | WO-2016178440 A1 | 11/2016 |

OTHER PUBLICATIONS

International Search Report and Written Opinion—PCT/US2019/031585—ISA/EPO—dated Jul. 3, 2019.

\* cited by examiner

*Primary Examiner* — Sharad Rampuria
(74) *Attorney, Agent, or Firm* — Liem T. Do; Holland & Hart LLP.

(57) ABSTRACT

Methods, systems, and devices for wireless communications are described that provide for mobility between base stations for a UE that may be in a coverage extension (CE) mode or a non-CE mode. A serving base station may provide a UE with an indication of one or more neighboring base stations within a same public mobile land network (PLMN). The UE may then prioritize base stations in the same PLMN ahead of other neighboring base stations within a same frequency priority in a reselection procedure. In some cases, a base station may allocate PLMN-specific CE mode random access resources and transmit CE mode broadcast transmissions upon request from a UE within the PLMN. In some cases, a UE operating in CE mode may use contention-based random access resources for random access requests rather than dedicated random access resources.

49 Claims, 18 Drawing Sheets

(51) Int. Cl.
*H04W 36/08* (2009.01)
*H04W 74/08* (2009.01)
*H04W 84/04* (2009.01)

(58) Field of Classification Search
CPC ......... H04W 36/0077; H04W 36/0061; H04W 36/00; H04W 36/0005; H04W 36/0007; H04W 36/0009; H04W 36/0016; H04W 36/03; H04B 7/18541; H04L 47/767
See application file for complete search history.

| Priority Level | freq. | Cell-ID |
|---|---|---|
| 0 | Frequency 1 | Cell-ID 1 (PLMN 1) |
| 0 | Frequency 1 | Cell-ID 2 (PLMN 1) |
| 1 | Frequency 1 | Cell-ID 3 (PLMN 2) |
| 2 | Frequency 1 | Cell-ID 4 (PLMN 3) |
| 2 | Frequency 1 | Cell-ID 4 (PLMN 4) |
| 3 | Frequency 1 | null |

MOBILITY FOR COVERAGE EXTENSION MODES IN WIRELESS COMMUNICATIONS

CROSS REFERENCE

The present Application for Patent claims the benefit of U.S. Provisional Patent Application No. 62/669,026 by FAN, et al., entitled "Mobility For Coverage Extension Modes in Wireless Communications," filed May 9, 2018, assigned to the assignee hereof, and expressly incorporated herein.

BACKGROUND

The following relates generally to wireless communications, and more specifically to mobility for coverage extension modes in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may use wireless resources (e.g., time resources, frequency resources, spatial resources, or combinations thereof) for random access procedures to initiate connections between a UE and a base station. Random access resources may be used for initial system access or for initiating a connection establishment as part of mobility procedures such as cell reselection procedures (which may be referred to in some cases as (re) selection procedures, mobility procedures, or handover procedures) in which a UE may establish a connection with a first base station that may be moved to a second base station. The random access procedures may include a contention based random access procedure where a device must contend for the channel before attempting access and a contention free random access procedure where resources are preconfigured for the device. In some cases, the random access procedures may be performed using wireless resources configured for a physical random access channel (PRACH) and may involve exchanging one or more random access channel (RACH) signals, e.g., a RACH message 1 (msg1) which may be referred to as a random access request, RACH message 2 (msg2), and the like. A random access request may include a random access sequence or preamble that is transmitted to a base station.

In cases where channel quality between a base station and a UE is relatively poor, the likelihood of successful receipt of a random access request at a base station may be reduced. In some cases, coverage extension (CE) techniques may be enabled which may provide enhanced coverage in such cases, such as through additional repetitions of transmissions, increased power for transmissions, or combinations thereof. Such CE techniques may use additional system resources relative to non-CE techniques, such as additional PRACH resources that may be provided for transmission of a CE mode random access request. Techniques for providing CE mode resources upon request may help to improve efficiency of wireless communications systems.

SUMMARY

The described techniques relate to improved methods, systems, devices, and apparatuses that support mobility for coverage extension modes in wireless communications. Various described techniques provide for mobility between base stations for a UE that may be in a coverage extension (CE) mode that allows base stations to avoid allocation of additional CE resources that may not be necessary. In some cases, a serving base station may provide a UE with an indication of one or more neighboring base stations within a same public mobile land network (PLMN). The UE may then prioritize base stations in the same PLMN ahead of other neighboring base stations within a same frequency priority in a selection or reselection procedure. In some cases, a base station may allocate PLMN-specific CE mode random access resources and transmit CE mode broadcast transmissions upon request from a UE within the PLMN. In further cases, a UE operating in CE mode may use contention-based random access resources for random access requests rather than dedicated random access resources.

A method of wireless communication at a UE is described. The method may include establishing a first connection with a first base station in a first PLMN, the first connection being a CE-mode connection or a non-CE mode connection, receiving, from the first base station, information associated with one or more neighboring base stations in the first PLMN for use in establishing a second connection with a second base station of the one or more neighboring base stations, the information including one or more parameters for establishing the second connection in a CE mode or in a non-CE mode, and transmitting a random access request to the second base station to establish the second connection based on the information associated with the one or more neighboring base stations in the first PLMN.

An apparatus for wireless communication at a UE is described. The apparatus may include a processor, memory coupled with the processor, and instructions stored in the memory. The instructions may be executable by the processor to cause the apparatus to establish a first connection with a first base station in a first PLMN, the first connection being a CE-mode connection or a non-CE mode connection, receive, from the first base station, information associated with one or more neighboring base stations in the first PLMN for use in establishing a second connection with a second base station of the one or more neighboring base stations, the information including one or more parameters for establishing the second connection in a CE mode or in a non-CE mode, and transmit a random access request to the second base station to establish the second connection based on the information associated with the one or more neighboring base stations in the first PLMN.

Another apparatus for wireless communication at a UE is described. The apparatus may include means for establishing a first connection with a first base station in a first PLMN, the first connection being a CE-mode connection or a non-CE mode connection, receiving, from the first base station, information associated with one or more neighboring base stations in the first PLMN for use in establishing a second connection with a second base station of the one or more neighboring base stations, the information including one or more parameters for establishing the second connection in a CE mode or in a non-CE mode, and transmitting a random access request to the second base station to establish the second connection based on the information associated with the one or more neighboring base stations in the first PLMN.

A non-transitory computer-readable medium storing code for wireless communication at a UE is described. The code may include instructions executable by a processor to establish a first connection with a first base station in a first PLMN, the first connection being a CE-mode connection or a non-CE mode connection, receive, from the first base station, information associated with one or more neighboring base stations in the first PLMN for use in establishing a second connection with a second base station of the one or more neighboring base stations, the information including one or more parameters for establishing the second connection in a CE mode or in a non-CE mode, and transmit a random access request to the second base station to establish the second connection based on the information associated with the one or more neighboring base stations in the first PLMN.

In some examples of the method, apparatuses, and non-transitory computer-readable medium described herein, the information associated with the one or more neighboring base stations in the first PLMN includes one or more received cell identifications (IDs) that have selection priority over one or more other neighboring base stations outside of the first PLMN. Some examples of the method, apparatuses, and non-transitory computer-readable medium described herein may further include operations, features, means, or instructions for identifying a cell reselection priority frequency for selecting base stations in a cell reselection procedure, identifying a set of neighboring base stations based on the cell reselection priority frequency, identifying a subset of the set of neighboring base stations based on the one or more received cell IDs, the subset of the set of neighboring base stations being in the first PLMN and selecting the second base station from the subset of the set of neighboring base stations.

In some examples of the method, apparatuses, and non-transitory computer-readable medium described herein, the information associated with the one or more neighboring base stations in the first PLMN may be received in a SIB or in RRC signaling. In some examples of the method, apparatuses, and non-transitory computer-readable medium described herein, the information associated with the one or more neighboring base stations in the first PLMN includes information for a CE request for requesting that broadcast transmissions of base stations in the first PLMN be transmitted in the CE mode. In some examples of the method, apparatuses, and non-transitory computer-readable medium described herein, a CE request resource for the first PLMN may be different than other CE request resources of other PLMNs. Some examples of the method, apparatuses, and non-transitory computer-readable medium described herein may further include operations, features, means, or instructions for selecting the second base station in a reselection procedure and transmitting, via the CE request resource, a CE request to the second base station that requests that broadcast transmissions of the second base station be transmitted in the CE mode.

Some examples of the method, apparatuses, and non-transitory computer-readable medium described herein may further include operations, features, means, or instructions for receiving a CE request response from the second base station and monitoring for CE mode broadcast transmissions from the second base station. Some examples of the method, apparatuses, and non-transitory computer-readable medium described herein may further include operations, features, means, or instructions for determining that a CE request response is not received from the second base station within a predetermined time period, terminating the reselection procedure for the second base station and selecting a third base station in the reselection procedure.

In some examples of the method, apparatuses, and non-transitory computer-readable medium described herein, the random access request transmitted to the second base station may be a contention-based random access request. In some examples of the method, apparatuses, and non-transitory computer-readable medium described herein, the contention-based random access request may be transmitted via extended physical random access channel (PRACH) resources configured for CE mode random access requests. In some examples of the method, apparatuses, and non-transitory computer-readable medium described herein, extended PRACH resources may be selected for the contention-based random access request based on a channel quality of the second base station being below a threshold value.

In some examples of the method, apparatuses, and non-transitory computer-readable medium described herein, the information associated with the one or more neighboring base stations includes a CE request resource for requesting that broadcast transmissions of the second base station be transmitted in the CE mode, and where the transmitting the random access request to the second base station further may include operations, features, means, or instructions for transmitting, prior to transmitting the contention-based random access request, a CE request to the second base station via the CE request resource and receiving, responsive to the CE request, an indication of extended physical random access channel (PRACH) resources configured for CE mode random access requests.

Some examples of the method, apparatuses, and non-transitory computer-readable medium described herein may further include operations, features, means, or instructions for receiving, responsive to the contention-based random access request, a random access response from the second base station and transmitting, responsive to the random access response, a cell radio network temporary identifier (C-RNTI) provided by the first base station to indicate to the second base station that the first connection was established with the first base station.

A method of wireless communication at a base station in a first PLMN is described. The method may include establishing a first connection with a UE, the first connection being a CE-mode connection or a non-CE mode connection, identifying a first subset of neighboring base stations in the first PLMN available for establishing a second connection with the UE, and a second subset of neighboring base stations outside of the first PLMN available for establishing the second connection with the UE, and transmitting, to the UE, information associated with at least the first subset of neighboring base stations for use in establishing the second connection, the information including one or more parameters for establishing the second connection in a CE mode or in a non-CE mode.

An apparatus for wireless communication at a base station in a first PLMN is described. The apparatus may include a processor, memory coupled with the processor, and instructions stored in the memory. The instructions may be executable by the processor to cause the apparatus to establish a first connection with a UE, the first connection being a CE-mode connection or a non-CE mode connection, identify a first subset of neighboring base stations in the first PLMN available for establishing a second connection with the UE, and a second subset of neighboring base stations outside of the first PLMN available for establishing the second connection with the UE, and transmit, to the UE, information associated with at least the first subset of neighboring base stations for use in establishing the second connection, the information including one or more parameters for establishing the second connection in a CE mode or in a non-CE mode.

Another apparatus for wireless communication at a base station in a first PLMN is described. The apparatus may include means for establishing a first connection with a UE, the first connection being a CE-mode connection or a non-CE mode connection, identifying a first subset of neighboring base stations in the first PLMN available for establishing a second connection with the UE, and a second subset of neighboring base stations outside of the first PLMN available for establishing the second connection with the UE, and transmitting, to the UE, information associated with at least the first subset of neighboring base stations for use in establishing the second connection, the information including one or more parameters for establishing the second connection in a CE mode or in a non-CE mode.

A non-transitory computer-readable medium storing code for wireless communication at a base station in a first PLMN is described. The code may include instructions executable by a processor to establish a first connection with a UE, the first connection being a CE-mode connection or a non-CE mode connection, identify a first subset of neighboring base stations in the first PLMN available for establishing a second connection with the UE, and a second subset of neighboring base stations outside of the first PLMN available for establishing the second connection with the UE, and transmit, to the UE, information associated with at least the first subset of neighboring base stations for use in establishing the second connection, the information including one or more parameters for establishing the second connection in a CE mode or in a non-CE mode.

In some examples of the method, apparatuses, and non-transitory computer-readable medium described herein, the information associated with the first subset of neighboring base stations includes one or more cell identifications (IDs) of the first subset of neighboring base stations that may have selection priority over the second subset of neighboring base stations. In some examples of the method, apparatuses, and non-transitory computer-readable medium described herein, the information associated with the first subset of neighboring base stations further includes a cell reselection priority frequency, and where the one or more cell IDs of the first subset of neighboring base stations have selection priority over cell IDs of base stations of the second subset of neighboring base stations that may be within the cell reselection priority frequency. In some examples of the method, apparatuses, and non-transitory computer-readable medium described herein, the transmitting includes transmitting the information associated with at least the first subset of neighboring base stations in a SIB or in RRC signaling.

In some examples of the method, apparatuses, and non-transitory computer-readable medium described herein, the information associated with the first subset of neighboring base stations includes a CE request resource for requesting that broadcast transmissions of base stations of the first PLMN be transmitted in the CE mode. In some examples of the method, apparatuses, and non-transitory computer-readable medium described herein, the CE request resource may be a first CE request resource for base stations of the first PLMN that may be different than a second CE request resource for the second subset of neighboring base stations. Some examples of the method, apparatuses, and non-transitory computer-readable medium described herein may further include operations, features, means, or instructions for receiving, from a second UE, a CE request that broadcast transmissions of the base station in the first PLMN be transmitted in the CE mode, determining that the second UE may be in the first PLMN and transmitting, responsive to the determining, a CE response to the second UE that indicates that broadcast transmissions will be transmitted in the CE mode.

In some examples of the method, apparatuses, and non-transitory computer-readable medium described herein, the information associated with at least the first subset of neighboring base stations indicates one or more parameters to enable a contention-based random access request from the UE to a second base station of the first subset of neighboring base stations. In some examples of the method, apparatuses, and non-transitory computer-readable medium described herein, the information associated with at least the first subset of neighboring base stations further indicates extended physical random access channel (PRACH) resources of the second base station that may be configured for CE mode random access requests. In some examples of the method, apparatuses, and non-transitory computer-readable medium described herein, the information associated with at least the first subset of neighboring base stations further indicates a CE request resource of the second base station.

BRIEF DESCRIPTION OF THE DRAWINGS

FIG. 3 illustrates an example of a PLMN-based priority that supports mobility for coverage extension modes in wireless communications in accordance with aspects of the present disclosure.

DETAILED DESCRIPTION

Figure 1:
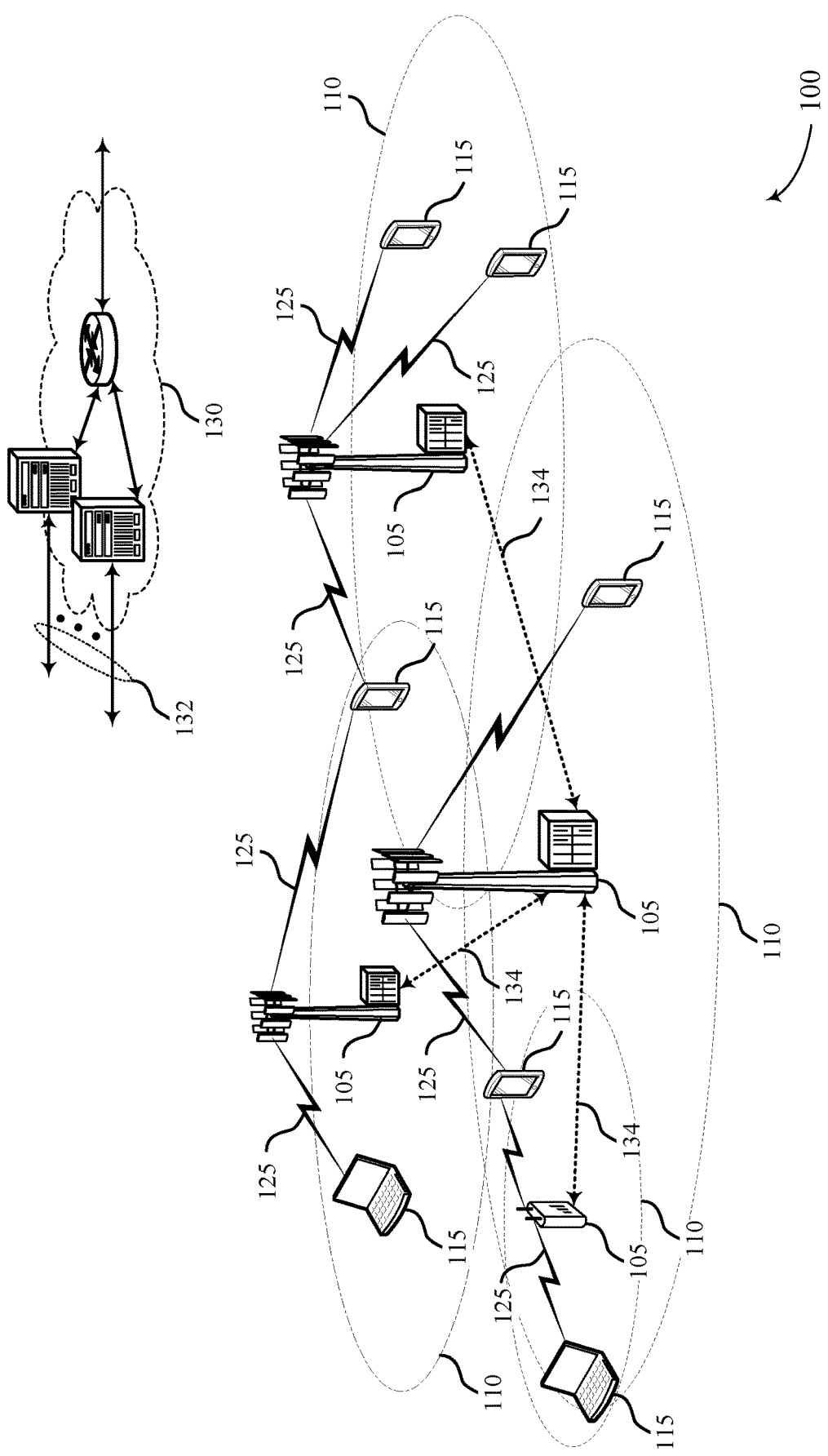
FIG. 1 illustrates an example of a system for wireless communications that supports mobility for coverage extension modes in wireless communications in accordance with aspects of the present disclosure.

As indicated above, some wireless communications systems may provide random access resources that may be used in conjunction with UE mobility procedures. For example, the network may use periodic and/or aperiodic time/frequency resources that a user equipment (UE) may use to transmit a random access request in a cell reselection procedure. Various aspects of the present disclosure provide techniques for mobility between base stations for a UE that may be in a coverage extension (CE) mode, or in a non-CE mode but that may need a CE-mode connection at some point. Such techniques may, in some cases, allow base stations to avoid allocation of additional CE resources that may not be necessary. In some cases, a serving base station may provide a UE with an indication of one or more neighboring base stations within a same public mobile land network (PLMN). The UE may then prioritize neighboring base stations in the same PLMN ahead of other neighboring base stations within a same frequency priority in a reselection procedure. In some cases, a base station may allocate PLMN-specific CE mode random access resources and transmit CE mode broadcast transmissions upon request from a UE within the PLMN. In further cases, a UE operating in CE mode may use contention-based random access resources for random access requests rather than dedicated random access resources.

When CE mode is used for UE mobility, a base station may transmit one or more broadcast transmissions (e.g., synchronization signal block (SSB) transmissions) in a repeating manner across broadcast resources to provide enhanced coverage for the broadcast transmissions. In such cases, the base station may also allocate additional physical random access channel (PRACH) resources that may be used for random access request transmissions from CE mode UEs. For example, a base station may aggregate two non-CE mode PRACH resources to provide a CE mode PRACH resource. In some cases, a UE that has an established connection with a base station may receive a dedicated random access preamble that may be provided with a random access request to establish a connection with a neighboring base station. The dedicated random access preamble may be used on a contention-free random access procedure, and one or more neighboring base stations may receive information from a serving base station of the UE to allow an efficient establishment of a connection as part of UE mobility.

In some cases, to help enhance network efficiency, a base station may only transmit CE mode broadcast transmissions and allocate CE mode PRACH resources when requested to do so. For example, a base station may receive a CE request from a UE and may initiate CE mode broadcast transmissions and PRACH resource allocation. In some cases, CE request resource may be allocated and a base station, upon receiving a CE request via the CE request resource, may initiate the CE mode. In cases where such a base station receives a request from a UE that is not in the base station's PLMN, the UE may not establish a connection and may instead attempt access to another base station within the UE's PLMN. Such situations may result in a base station allocating CE mode resources that did not result in a completed connection with a UE. Various aspects of the present disclosure provide for PLMN-based priority, CE request resources, or combinations thereof that may provide a higher likelihood that CE mode resources are used for UEs within a base station's PLMN. Additionally of alternatively, UEs operating in CE mode may use contention-based PRACH resources, and dedicated CE mode random access resources and preambles are not provided.

Aspects of the disclosure are initially described in the context of a wireless communications system. Aspects of the disclosure are further illustrated by and described with reference to apparatus diagrams, system diagrams, and flowcharts that relate to mobility for coverage extension modes in wireless communications.

FIG. 1 illustrates an example of a wireless communications system 100 that supports mobility for coverage extension modes in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may use CE techniques to enhance the likelihood of successful transmissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over base station backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, a base station 105 and UE 115 may operate in a CE mode. For example, if the UE 115 is a low power device or located in an area with poor coverage (e.g., within a building basement), CE mode communications may provide increased repetitions for transmissions that may be combined at a receiver to enhance demodulation and decoding of the transmissions. In cases where a UE 115 is initially connected with a serving base station 105 using CE mode communications (or using non-CE mode communications), and the UE 115 initiates a cell (re)selection procedure (e.g., when coming out of an idle mode or as part of an autonomous cell (re)selection), CE mode communications may be needed at the serving base station 105 or a neighboring or target base station 105. When referring to cell (re)selection, reference is made to the UE 115 selecting a cell or base station for a connection, which may be a same base station 105 to which the UE 115 was previously connected or a different neighboring base station 105. Various described techniques provide for cell (re)selection and mobility between base stations 105 for a UE 115 that may be in a CE mode that allows base stations 105 to avoid allocation of additional CE resources that may not be necessary.

In some cases, a serving base station 105 may provide a UE 115 with an indication of one or more neighboring base stations 105 within a same PLMN. The UE may then prioritize the neighboring base stations 105 in the same PLMN ahead of other neighboring base stations 105 within a same frequency priority in a (re)selection procedure. In some cases, a base station 105 may allocate PLMN-specific CE mode random access resources and transmit CE mode broadcast transmissions upon request from a UE 115 within the PLMN. In further cases, a UE 115 operating in CE mode may use contention-based random access resources for random access requests rather than dedicated random access resources.

Figure 2:
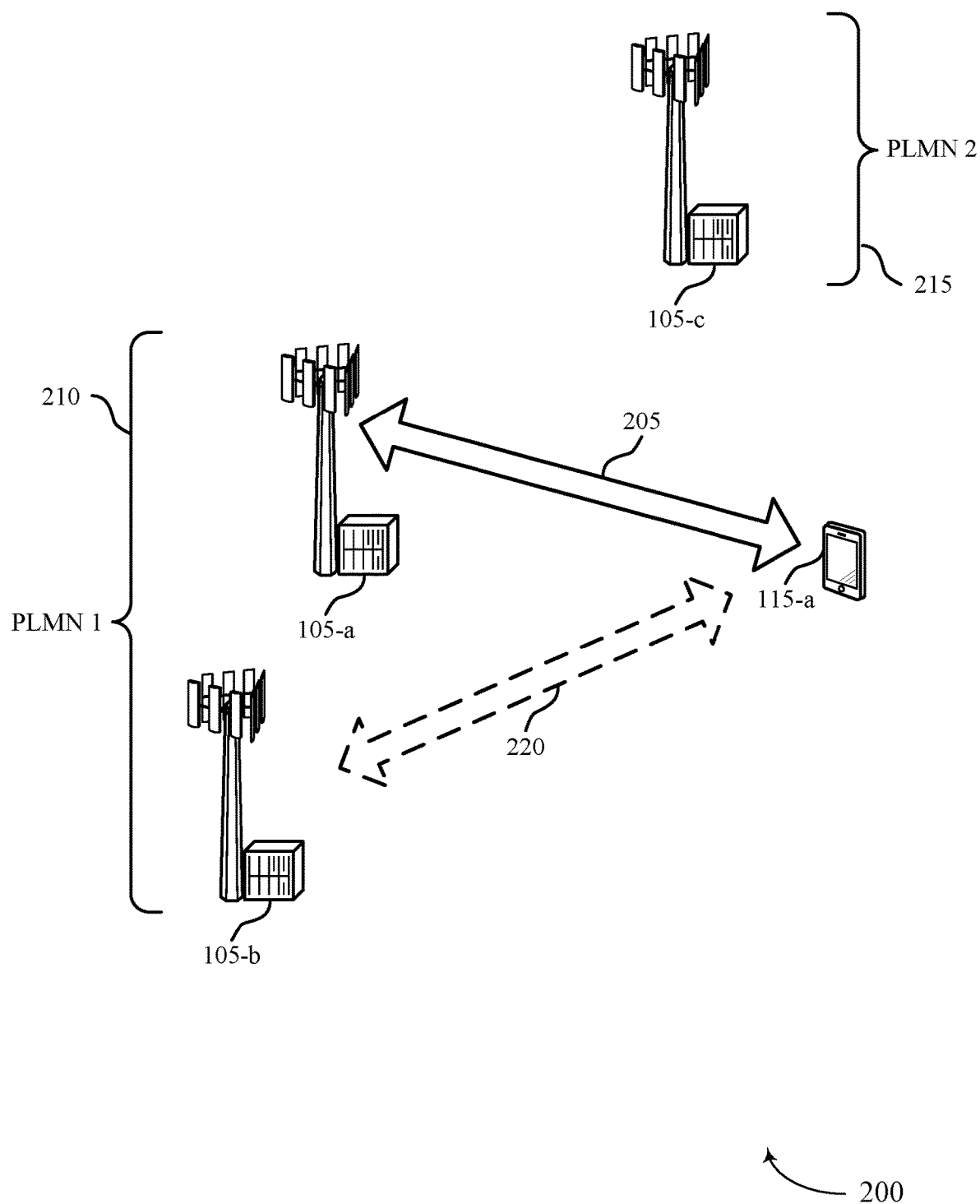
FIG. 2 illustrates an example of a portion of a wireless communications system that supports mobility for coverage extension modes in wireless communications in accordance with aspects of the present disclosure.

FIG. 2 illustrates an example of a wireless communications system 200 that supports mobility for coverage extension modes in wireless communications in accordance with aspects of the present disclosure. In some examples, wireless communications system 200 may implement aspects of wireless communications system 100. In some examples, the wireless communications system 200 may include a first base station 105-a, a second base station 105-b, and a third base station 105-c, which may be examples of the corresponding devices as described with reference to FIG. 1. UE 115-a may communicate with the base station 105-a within a coverage area via a first connection 205.

In some examples, the first base station 105-a and the second base station 105-b, and the UE 115-a, may be in a first PLMN 210. In this example, the third base station 105-c may be in a second PLMN 215. In some cases, the UE 115-a may perform cell (re)selection to connect to a different base station 105 than the first base station 105-a. Such a cell (re)selection may result from the first connection 205 experiencing shadowing or interference, or from the UE 115-a coming out of idle mode, for example and identifying the different base station for a connection, although in some cases the first base station 105-a may be selected when coming out of idle mode. The first connection 205 may be, in some cases, a CE mode connection. In other cases, the first connection may be a non-CE mode connection. In some cases, the first connection 205 may be established by the first base station 105-a transmitting broadcast signals (e.g., SSB, remaining minimum system information (RMSI), other system information (OSI), etc.) using a CE mode to accommodate the CE mode UE 115-a any other CE mode UEs that may be present, which may use UE-specific CE parameters for UE-specific signaling. As indicated above, in a given cell, CE mode transmissions (e.g., extended SSB/RMSI/OSI transmissions) are only needed for CE users, and always broadcasting CE mode transmissions (e.g., SSB/RMSI/OSI transmissions) in CE mode may incur additional system overhead relative to only non-CE mode transmissions. In cases, where there are no UEs in CE mode, such additional overhead may be avoided, and system resources used more efficiently. Such additional system overhead is even more pronounced in mmW systems, where such broadcast transmission (e.g., SSB/RMSI/OSI transmissions) may be transmitted via multiple transmit beams in multiple beam directions.

As indicated above, in some cases, to help alleviate system overhead associated with CE mode broadcast transmissions, base stations 105 may transmit broadcast signaling in CE mode only when requested by UE 115-a or another UE that is in CE mode. Once the first connection 205 is established, the UE 115-*a* may, as discussed above, initiate a cell (re)selection procedure. For example, the UE 115-*a* may be in idle mode and perform a cell (re)selection procedure. In some systems, the UE 115-*a* may select a neighboring base station 105 based on a frequency priority in which other base stations 105 that operate at a same frequency at the first base station 105-*a* are prioritized for reselection. In cases where the first connection 205 uses licensed or dedicated radio frequency spectrum, different operators of different PLMNs may use different frequencies, and therefore such frequency priority may be sufficient to have the UE 115-*a* prioritize the second base station 105-*b* within the first PLMN 210 ahead of the third base station 105-*c* of the second PLMN 215.

However, in cases where shared spectrum or unlicensed spectrum is used for the first connection 205, both the second base station 105-*b* and the third base station 105-*c* may operate using the same frequency spectrum. In such cases, the UE 115-*a*, as part of a (re)selection procedure, may select the third base station 105-*c* and attempt to establish a connection. As part of the connection establishment process, the UE 115-*a* may determine that the third base station 105-*c* is not in the first PLMN 210 (e.g., after reading RMSI of the third base station 105-*c*), discontinue the connection establishment and attempt a second connection establishment with the second base station 105-*b*. Further, in cases where the UE 115-*a* is in a CE mode, a CE request may be transmitted to the third base station 105-*c*, which may result in the third base station 105-*c* transmitting signaling in CE mode unnecessarily. Further, access time and power consumption at the UE 115-*a* may be increased by the initial access attempt. Various techniques provided herein may enhance efficiency by providing PLNM-based priority, PLMN-specific CE request resources, contention-based CE random access requests, or any combinations thereof.

In some cases, the first base station 105-*a*, as a serving base station to the UE 115-*a* for the first connection 205, may provide multiple neighbor cell configurations to the UE 115-*a* that may be used for cell (re)selection or handover, which may occur at a later time. In some cases, the first base station 105-*a* may provide cell IDs for other base stations 105, including second base station 105-*b*, that are in the first PLMN, and the UE 115-*a* may prioritize such cell IDs when attempting to establish a second connection 220. Further, in some cases, when the UE 115-*a* actually switches between base stations 105, it is not clear whether UE 115-*a* will be in non-CE mode or CE mode with respect to the target cell. In some cases, the UE 115-*a* may determine that a CE mode connection is to be established, and may transmit a CE request. In some cases, PLMN-specific CE request resources may be provided, and base stations 105 may ignore CE requests that are transmitted on a CE request resource that is not associated with the base station's PLMN. In some cases, the UE 115-*a* may scramble its CE request with a PLMN ID of the preferred PLMN. In some cases, the UE 115-*a* may be configured with a dedicated random access preamble that may be used in a contention free random access procedure with the second base station 105-*b*. In some cases, the UE 115-*a* may use contention-based random access resources when attempting to establish the second connection 220 in a CE mode.

FIG. 3 illustrates an example of a PLMN-based priority table 300 that supports mobility for coverage extension modes in wireless communications in accordance with aspects of the present disclosure. In some examples, PLMN-based priority table 300 may be implemented in aspects of wireless communications system 100 or 200. In this example, a serving base station may configure a UE with cell-level priority in addition to frequency priority for cell reselection.

In this example, PLMN-based priority table 300 may include priority levels 305 that are associated with frequencies 310 and cell-IDs 315. In this example, cell-IDs 315 for base stations in a first PLMN may be prioritized ahead of cell IDs of base stations of other PLMNs. More specifically, a serving base station in a first PLMN (PLMN 1) may prioritize cell-ID 1 and cell-ID 2, which are both in the first PLMN, as priority zero or a highest priority. Other base stations not within the first PLMN are prioritized below the first PLMN and thus a UE may attempt to connect to such base stations after it is determined that the higher priority base stations are not detected or attempts to connect are unsuccessful. In the example of FIG. 3, a third cell-ID of a second PLMN may have a second priority, and fourth and fifth cell-IDs may have a third priority, which may provide a preference order for two or more PLMNs that may be present (e.g., where operators of certain PLMNs may provide lower cost connections).

In some cases, cell-level priority may be indicated to UEs in system information or in dedicated signaling (e.g., RRC signaling). In some cases, is a base station does not provide any cell level priority, the UE may assume all cells on the same frequency have equal priority and use frequency priority for cell reselection. In some cases, if the UE detects a cell which is not provided with cell level priority, the UE may assume the cell priority equal to the associated frequency priority for cell reselection (e.g., the priority associated with a null cell-ID in FIG. 3). In some cases, cell level priority may be used for both non-CE and CE modes of operation.

Figure 4:
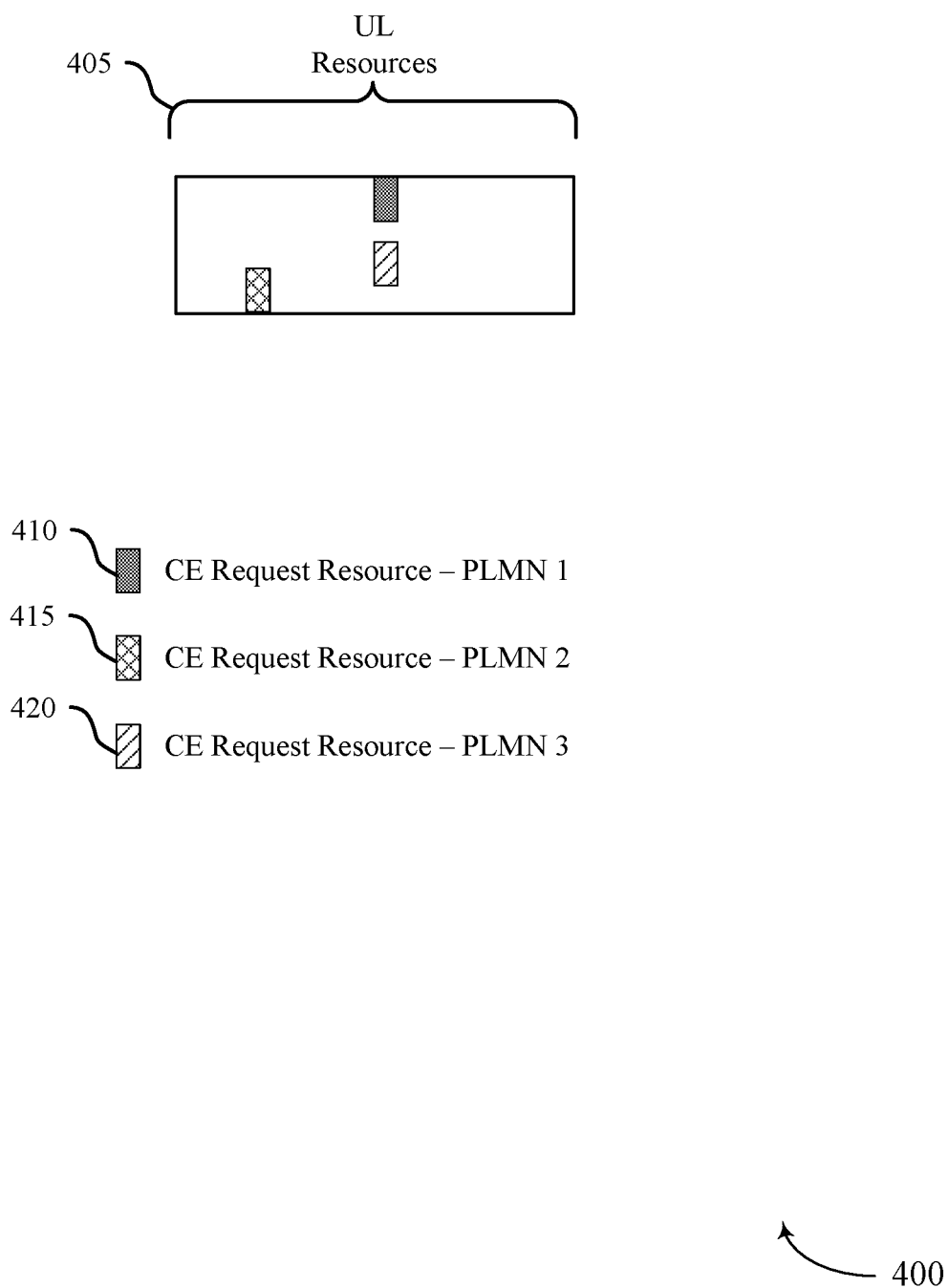
FIG. 4 illustrates an example of a PLMN-specific CE request resource that supports mobility for coverage extension modes in wireless communications in accordance with aspects of the present disclosure.

FIG. 4 illustrates an example of a PLMN-specific CE request resource 400 that supports mobility for coverage extension modes in wireless communications in accordance with aspects of the present disclosure. In some examples, PLMN-specific CE request resource 400 may implement aspects of wireless communications system 100. In this example, uplink resources 405 (e.g., PRACH resources) may be configured to allow UEs to transmit uplink transmissions to a base station, such as random access requests or CE requests. As indicated above, in some cases a base station may not transmit CE mode broadcast transmissions until receiving a CE request.

In the example of FIG. 4, three different PLMNs may be present and have overlapping coverage areas in which a UE may be located. In order to avoid a UE transmitting a CE request to a base station of a different PLMN, different CE request resources may be configured for each PLMN. In the example of FIG. 4, a first PLMN may have a first CE request resource 410, a second PLMN may have a second CE request resource 415, and a third PLMN may have a third CE request resource 420.

The different CE request resources 410, 415, and 420, may have different time domain resources, different frequency domain resources, different code resources, different spatial resources, or different sequences, or any combinations thereof. In cases where a UE is in the first PLMN, and CE mode transmissions are needed at the UE, a CE request may be transmitted using the first CE request resource 410. If the CE request is transmitted to a base station of the second PLMN or third PLMN, the base station will not detect the CE request and not respond by transmitting broadcast signals in CE mode. In some cases, the UE may attempt a predetermined number of CE requests (e.g., 2 or 3 CE requests per base station), and move to a next candidate base station if a CE mode broadcast signal is not detected.

In some cases, in order to further reduce access times, a CE request response may be transmitted by a base station upon receipt of a CE request. In such cases, a base station may detect a CE request on its corresponding CE request resource and, upon detection, may transmit a CE request response that indicates the base station will transmit broadcast transmissions and configure PRACH resources for CE mode transmissions. In some cases, the CE request response from the base station may be PLMN specific. Thus, if the UE does not detect a CE request response following a CE request, it can early terminate the reselection and move to a next candidate base station for reselection. Accordingly, UE access delay can be further reduced, by allowing the UE to move to subsequent candidate cells more efficiently.

In some cases, when a UE tries to detect a cell after power up (e.g., based on SSB detection), the UE the determine that a connection should be in CE mode. The UE may then identify, such as from PBCH or other broadcast signaling, the resources to send CE request. In some cases, as discussed above, the CE request resource may be different for different PLMNs. In other cases, the CE request sequence may be scrambled by the UE's preferred PLMN ID and transmitted using a same CE request resource as another PLMN. In either case, the UE sends the CE request message, which may be detected by the base station in the UE's preferred PLMN.

Further, as indicated above, in some cases, a UE operating in CE mode may transmit a random access request using contention-based random access resources. In such cases, the UE may be configured with a dedicated random access preamble for non-CE mode random access requests, but if CE mode is used the UE will use contention-based resources. Such techniques may allow base stations to reduce PRACH overhead associated with autonomous UL mobility compared to cases where dedicated PRACH preambles may be provided for both CE mode and non-CE mode. In such cases, the UE may obtain system information from a source cell about one or more neighbor cell PRACH configurations, and perform contention-based random access at the target cell when CE mode is used. In some cases, the UE may select CE mode or non-CE mode based on signal strength measurements of the target base station (e.g., downlink path loss). In some cases, contention-based random access may be used in conjunction with a CE request discussed above. In such cases, a source base station may provide a UE with the CE request resource when the neighbor base station PRACH configuration does not contain any extended PRACH resources. Upon detection of the CE request, the neighbor base station may start allocating extended PRACH resources. In such cases, the initial random access request may be transmitted using the extended PRACH resources, and the target base station may transmit a random access response (e.g., MSG 2). In response, the UE may indicate its cell radio network temporary identifier (C-RNTI) provided by the source base station (which may be a first base station), to indicate to the target station (which may be a second base station) that the UE had a previously established first connection with the source base station.

Figure 5:
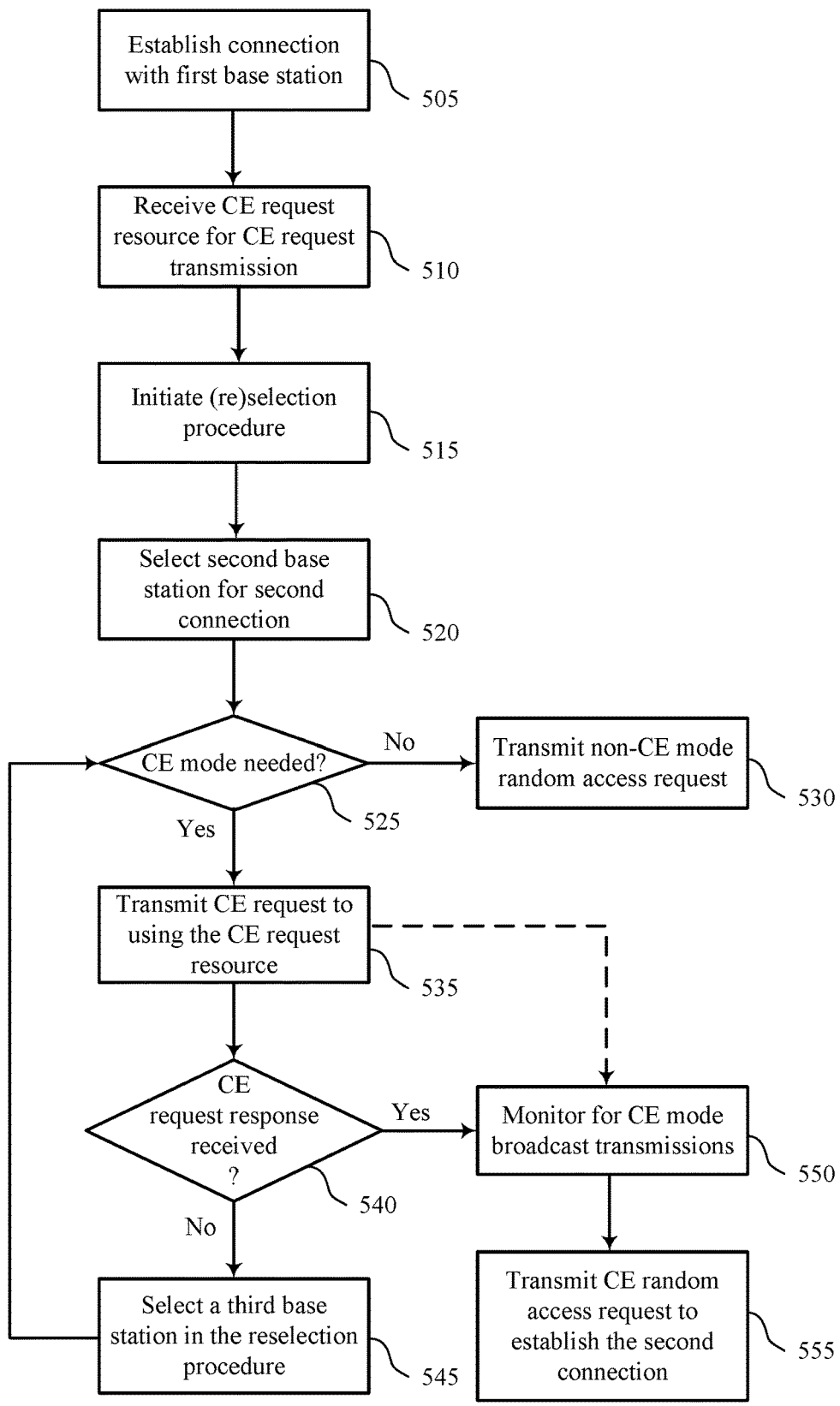
FIG. 5 illustrates an example of a process that supports mobility for coverage extension modes in wireless communications in accordance with aspects of the present disclosure.

FIG. 5 illustrates an example of a process 500 that supports reselection or mobility for coverage extension modes in wireless communications in accordance with aspects of the present disclosure. In some examples, process 500 may implement aspects of wireless communications system 100. As indicated above, in some cases a UE may transmit a CE request using CE request resources, and process 500 is an example of operations that may be performed in such cases.

In this example, at 505, the UE may establish a connection with a first base station. Such a connection may be a CE mode connection, or a non-CE mode connection. In some cases, the first base station may transmit mobility information to the UE, such as via system information or via dedicated signaling (e.g., RRC signaling). In some cases, the first base station and the UE may be in a first PLMN, and the mobility information may include, for example, information on one or more neighboring base stations, cell level priority information, CE request information, dedicated preamble information for neighboring base stations, and the like.

At 510, the UE may receive a CE request resource for a CE request transmission. The CE request resource may be included, in some cases, with the mobility information as discussed above. In some cases, the CE request resource may be PLMN specific, such that different PLMNs have different CE request resources.

At 515, the UE may initiate a reselection procedure. As discussed above, in some cases the reselection procedure may be initiated some period of time after the UE receives the mobility information from the base station. In some cases, the UE may initiate a reselection procedure as part of an idle mode procedure.

At 520, the UE may select a second base station for a second connection. The selection of the second base station may be made according to a frequency priority for reselection, in some cases. In some cases, in addition to the frequency priority, the selection of the second base station may be made according to a cell level priority for reselection.

At 525, the UE may determine whether CE mode is needed for the second connection. In some cases, the UE may measure one of more downlink signals of the second base station and determine whether CE mode is needed based on a signal strength of the one or more downlink signals. For example, the UE may measure a downlink path loss of a channel state information (CSI) reference signal (RS) transmitted in an SSB by the second base station. If the downlink path loss is at or below a predetermined threshold value, the UE may determine that CE mode is to be used for the second connection.

At 530, if the UE determines that CE mode is not to be used for the second connection, the UE may transmit a non-CE mode random access request to the second base station. In some cases, the non-CE mode random access request may be transmitted using a dedicated random access preamble in a contention-free random access procedure.

At 535, if the UE determines that CE mode is to be used for the second connection, the UE may transmit a CE request to the second base station using the CE request resource. In some cases, the CE request may request that the second base station transmit broadcast transmissions in a CE mode and allocate CE mode PRACH resources for a CE mode random access request. In some cases, the UE may transmit the CE request upon determination that the second base station is not currently transmitting CE mode broadcast transmissions.

At 540, the UE may determine whether a CE request response is received from the second base station. In some cases, the CE request response is a flag transmitted in a broadcast transmission of the base station that indicates that CE mode broadcast transmissions will be transmitted.

At 545, if the UE determines that the CE request response is not received, the UE may select a third base station in the reselection procedure, and perform operations starting at 525. In some cases, the UE may monitor for the CE request response for a certain time period before determining that the CE request response is not received. In some cases, the UE may retransmit the CE request one or more times.

At 550, if the UE determines that the CE request response has been received, the UE may monitor for CE mode broadcast transmissions. The CE mode broadcast transmissions may include, for example SSB transmissions that are transmitted using multiple repetitions associated with the CE mode. In some cases, the CE mode broadcast transmissions may indicate PRACH resources that are configured for transmission of random access requests. In some cases, a separate CE request response may not be transmitted by the base station, and the UE may simply perform the operations at 550 following the transmission of the CE request at 535.

At 555, the UE may transmit a CE random access request to establish the second connection. In some cases, the CE random access request may be transmitted using PRACH resources that are configured for CE mode random access requests (e.g., aggregated PRACH resources that allow repetition of a random access preamble). In some cases, the CE random access request may include a dedicated random access preamble for initiating a contention-free random access procedure to establish the second connection. In other cases, the CE random access request may be a contention-based random access request, similarly as discussed above.

Figure 6:
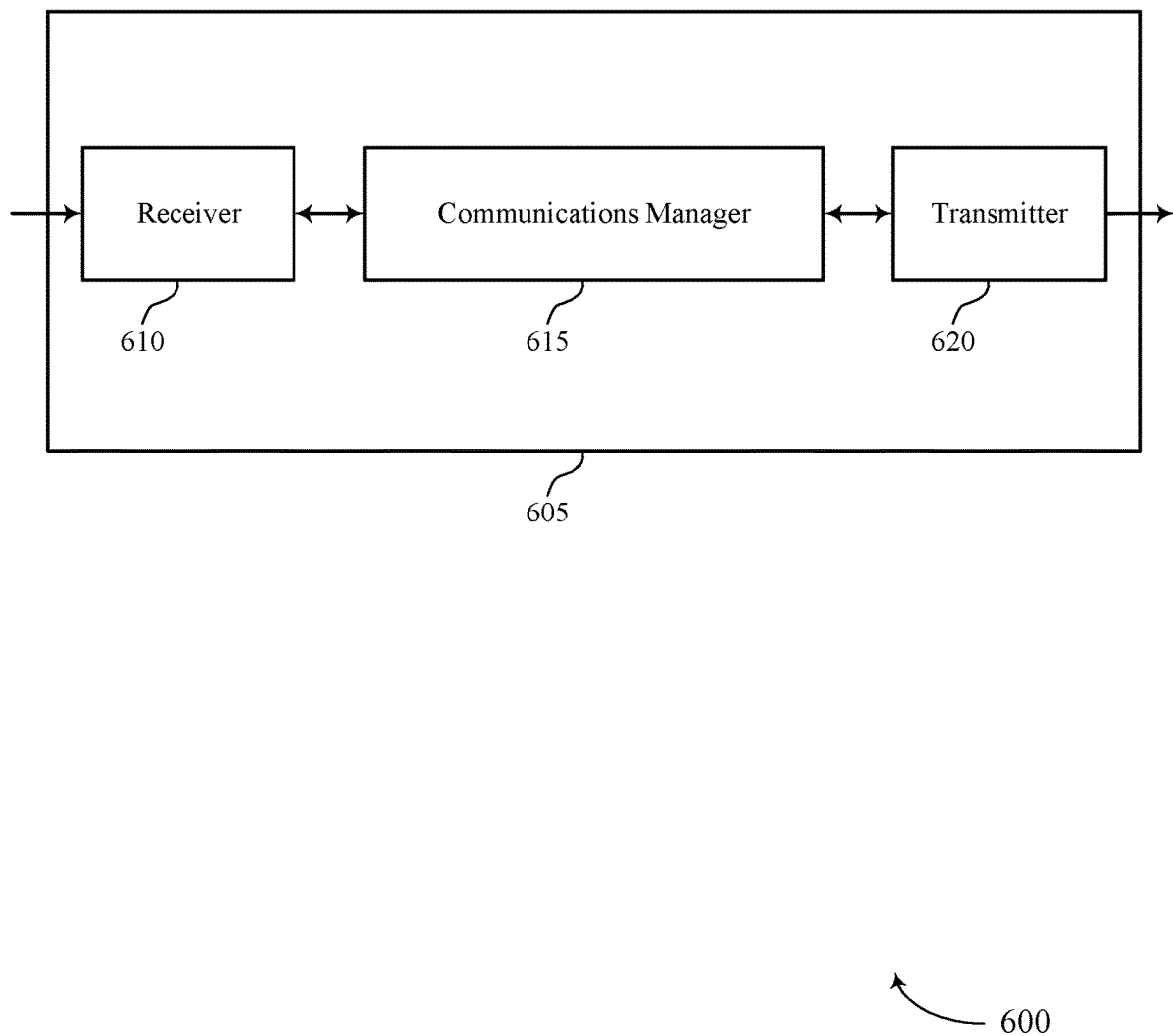
FIGS. 6 and 7 show block diagrams of devices that support mobility for coverage extension modes in wireless communications in accordance with aspects of the present disclosure.

FIG. 6 shows a block diagram 600 of a device 605 that supports mobility for coverage extension modes in wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to mobility for coverage extension modes in wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a first connection with a first base station in a PLMN, the first connection being a CE mode connection or a non-CE mode connection, receive, from the first base station, information associated with one or more neighboring base stations in the first PLMN for use in establishing a second connection with a second base station of the one or more neighboring base stations, the information including one or more parameters for establishing the second connection in the CE mode or in the non-CE mode, and transmit a random access request to the second base station to establish the second connection based on the information associated with the one or more neighboring base stations in the first PLMN. In some cases, the first base station may be selected for the second connection and the random access request may be transmitted to the first base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
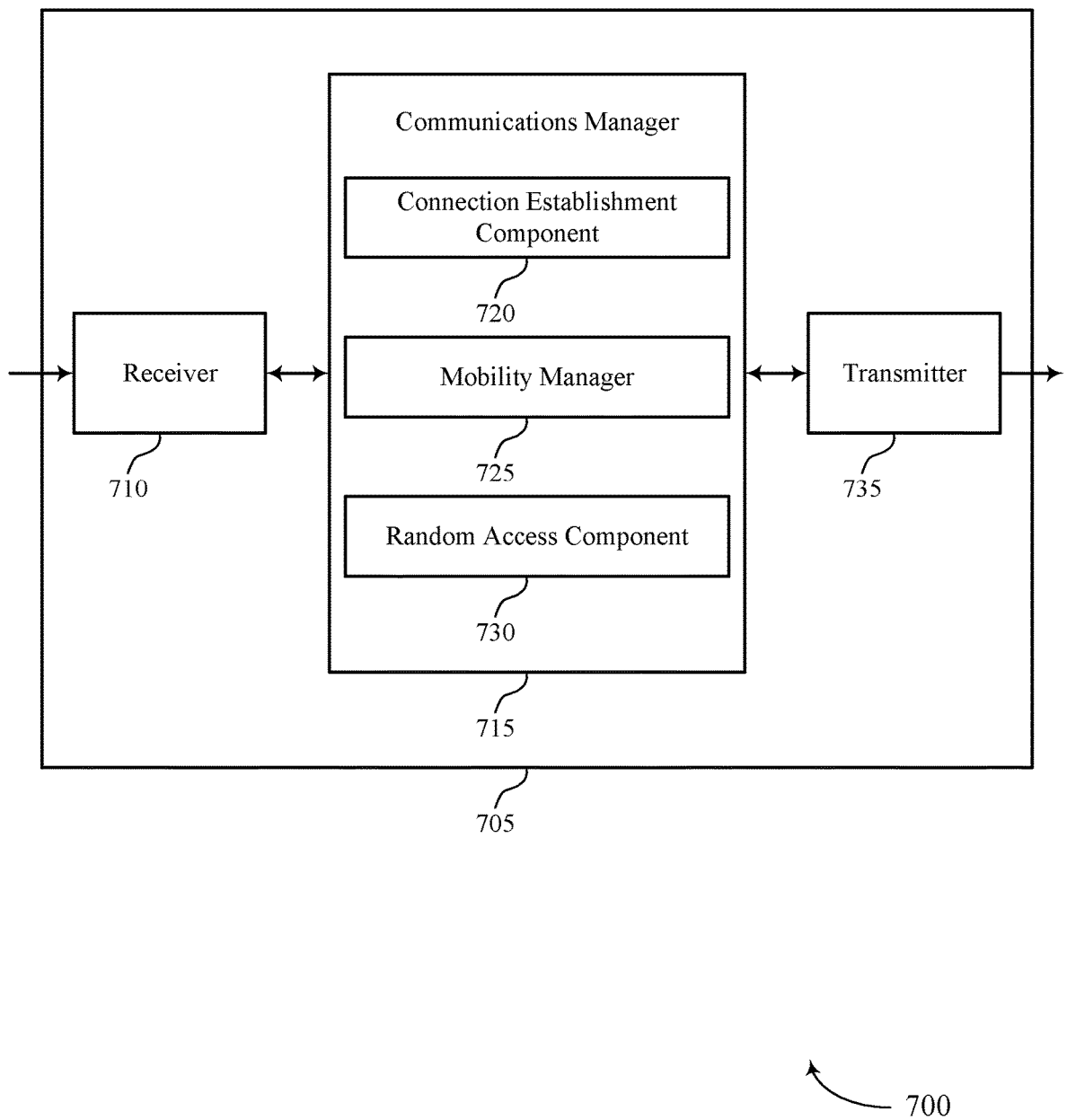

FIG. 7 shows a block diagram 700 of a device 705 that supports mobility for coverage extension modes in wireless communications in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to mobility for coverage extension modes in wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection establishment component 720, a mobility manager 725, and a random access component 730. The communications manager 715 may be an example of aspects of the communications manager 910 described herein.

The connection establishment component 720 may establish a first connection with a first base station in a first PLMN, the first connection being a CE mode connection, or a non-CE mode connection.

The mobility manager 725 may receive, from the first base station, information associated with one or more neighboring base stations in the first PLMN for use in establishing a second connection with a second base station in the first PLMN, the information including one or more parameters for establishing the second connection in the CE mode or in a non-CE mode.

The random access component 730 may transmit a random access request to the second base station to establish the second connection based on the information associated with the one or more neighboring base stations in the first PLMN.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
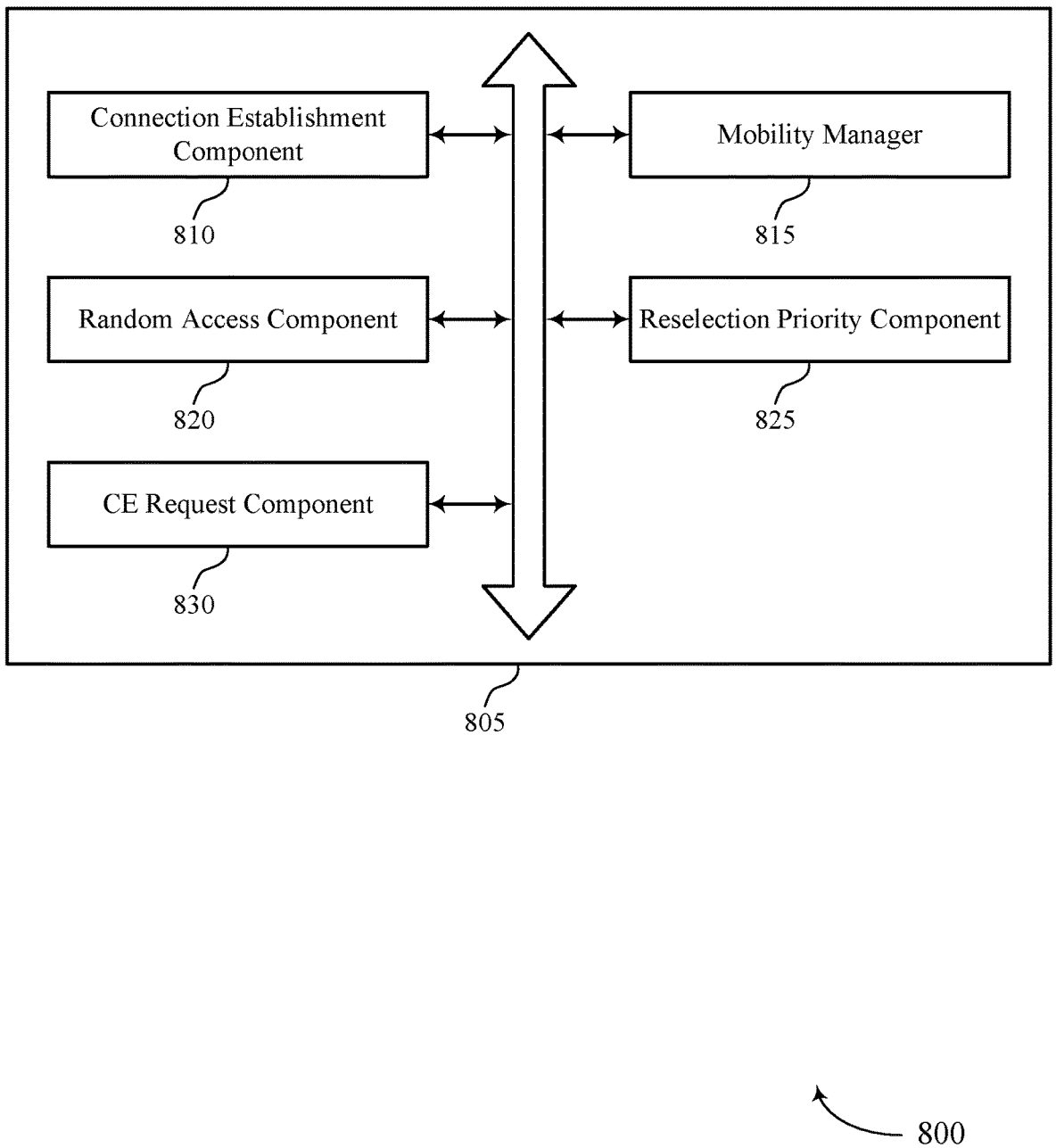
FIG. 8 shows a block diagram of a communications manager that supports mobility for coverage extension modes in wireless communications in accordance with aspects of the present disclosure.

FIG. 8 shows a block diagram 800 of a communications manager 805 that supports mobility for coverage extension modes in wireless communications in accordance with aspects of the present disclosure. The communications manager 805 may be an example of aspects of a communications manager 615, a communications manager 715, or a communications manager 910 described herein. The communications manager 805 may include a connection establishment component 810, a mobility manager 815, a random access component 820, a reselection priority component 825, and a CE request component 830. Each of these modules may communicate, directly or indirectly, with one another (e.g., via one or more buses).

The connection establishment component 810 may establish a first connection with a first base station in a first PLMN, the first connection being a CE mode or non-CE mode connection.

The mobility manager 815 may receive, from the first base station, information associated with one or more neighboring base stations in the first PLMN for use in establishing a second connection with a second base station of the one or more neighboring base stations, the information including one or more parameters for establishing the second connection in the CE mode or in the non-CE mode. In some cases, the information associated with the one or more neighboring base stations in the first PLMN includes one or more received cell IDs that have selection priority over one or more other neighboring base stations outside of the first PLMN. In some cases, the information associated with the one or more neighboring base stations in the first PLMN is received in a SIB or in RRC signaling.

The random access component 820 may transmit a random access request to the second base station to establish the second connection based on the information associated with the one or more neighboring base stations in the first PLMN. In some cases, the random access request may include a preamble that is received from the first base station for a contention-free random access procedure. In some cases, the random access request may be transmitted to the first base station.

In some cases, the random access request transmitted to the second base station is a contention-based random access request. In some examples, the random access component 820 may receive, responsive to a contention-based random access request, a random access response from the second base station, and may transmit, responsive to the random access response, a cell radio network temporary identifier (C-RNTI) provided by the first base station to indicate to the second base station that the first connection was established with the first base station. In some cases, the contention-based random access request is transmitted via extended PRACH resources configured for CE mode random access requests. In some cases, the extended PRACH resources are selected for the contention-based random access request based on a channel quality of the second base station being below a threshold value.

The reselection priority component 825 may identify a cell reselection priority frequency for selecting base stations in a cell reselection procedure. In some examples, the reselection priority component 825 may identify a set of neighboring base stations based on the cell reselection priority frequency. In some examples, the reselection priority component 825 may identify a subset of the set of neighboring base stations based on the one or more received cell IDs, the subset of neighboring base stations being in the first PLMN. In some examples, the reselection priority component 825 may select the second base station from the subset of neighboring base stations.

The CE request component 830 may select the second base station in a reselection procedure. In some examples, the CE request component 830 may transmit, via the CE request resource, a CE request to the second base station that requests the broadcast transmissions of the second base station to be transmitted in the CE mode. In some examples, the CE request component 830 may receive a CE request response from the second base station. In some examples, the CE request component 830 may monitor for CE mode broadcast transmissions from the second base station. In some examples, the CE request component 830 may determine that a CE request response is not received from the second base station within a predetermined time period, and may terminate the reselection procedure for the second base station. In some examples, the CE request component 830 may select a third base station in the reselection procedure.

In some examples, the CE request component 830 may transmit, prior to transmitting the contention-based random access request, a CE request to the second base station via the CE request resource. In some examples, the CE request component 830 may receive, responsive to the CE request, an indication of extended physical random access channel (PRACH) resources configured for CE mode random access requests. In some cases, the information associated with the one or more neighboring base stations in the first PLMN includes a CE request resource for requesting broadcast transmissions of the one or more neighboring base stations in the first PLMN to be transmitted in a CE mode. In some cases, the CE request resource for the first PLMN is different than other CE request resources of other PLMNs.

Figure 9:
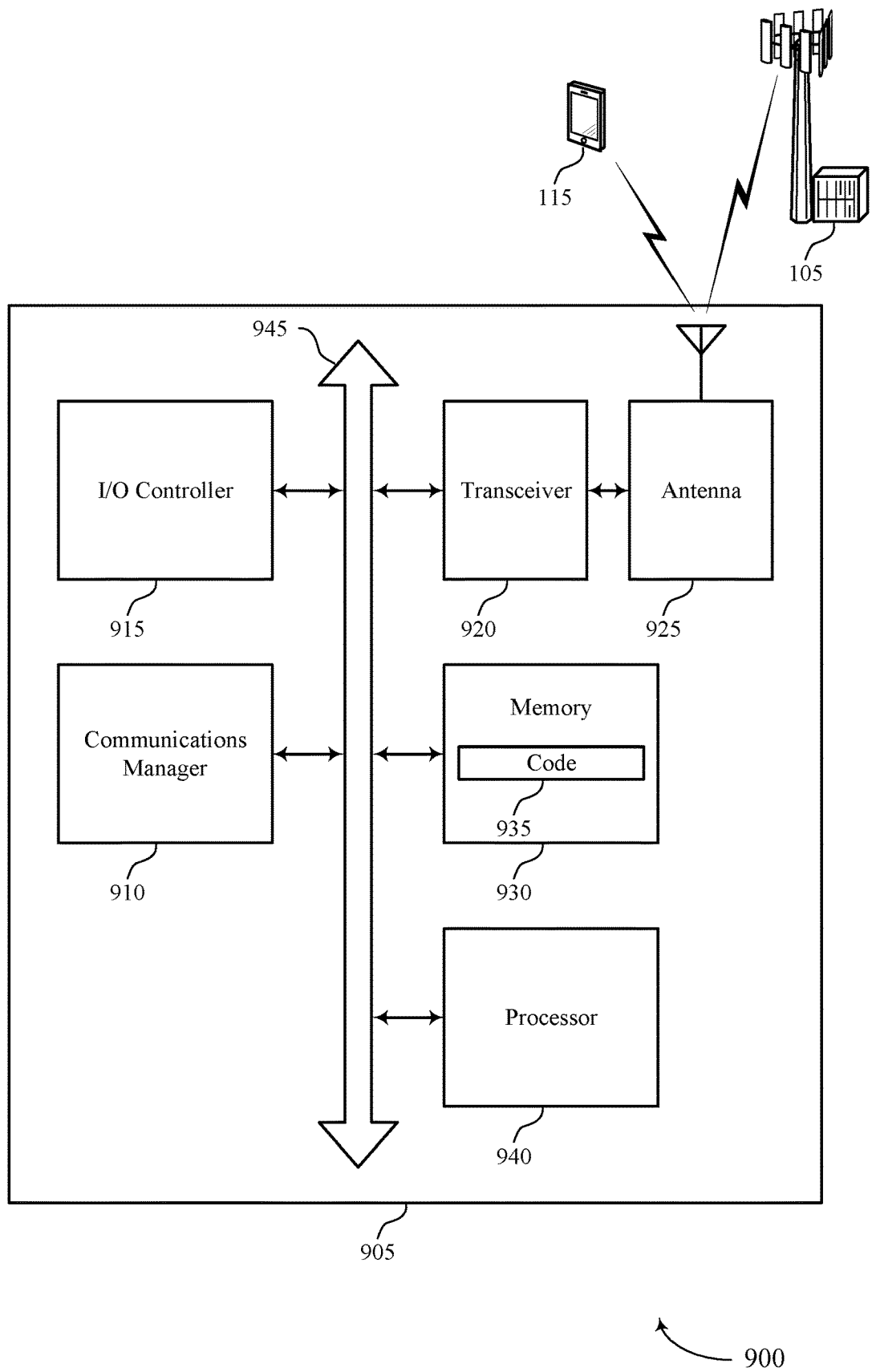
FIG. 9 shows a diagram of a system including a device that supports mobility for coverage extension modes in wireless communications in accordance with aspects of the present disclosure.

FIG. 9 shows a diagram of a system 900 including a device 905 that supports mobility for coverage extension modes in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a first connection with a first base station in a first PLMN, the first connection being a CE mode connection or non-CE mode connection, receive, from the first base station, information associated with one or more neighboring base stations in the first PLMN for use in establishing a second connection with a second base station of the one or more neighboring base stations, the information including one or more parameters for establishing the second connection in the CE mode or in a non-CE mode, and transmit a random access request to the second base station to establish the second connection based on the information associated with the one or more neighboring base stations in the first PLMN.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting mobility for coverage extension modes in wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
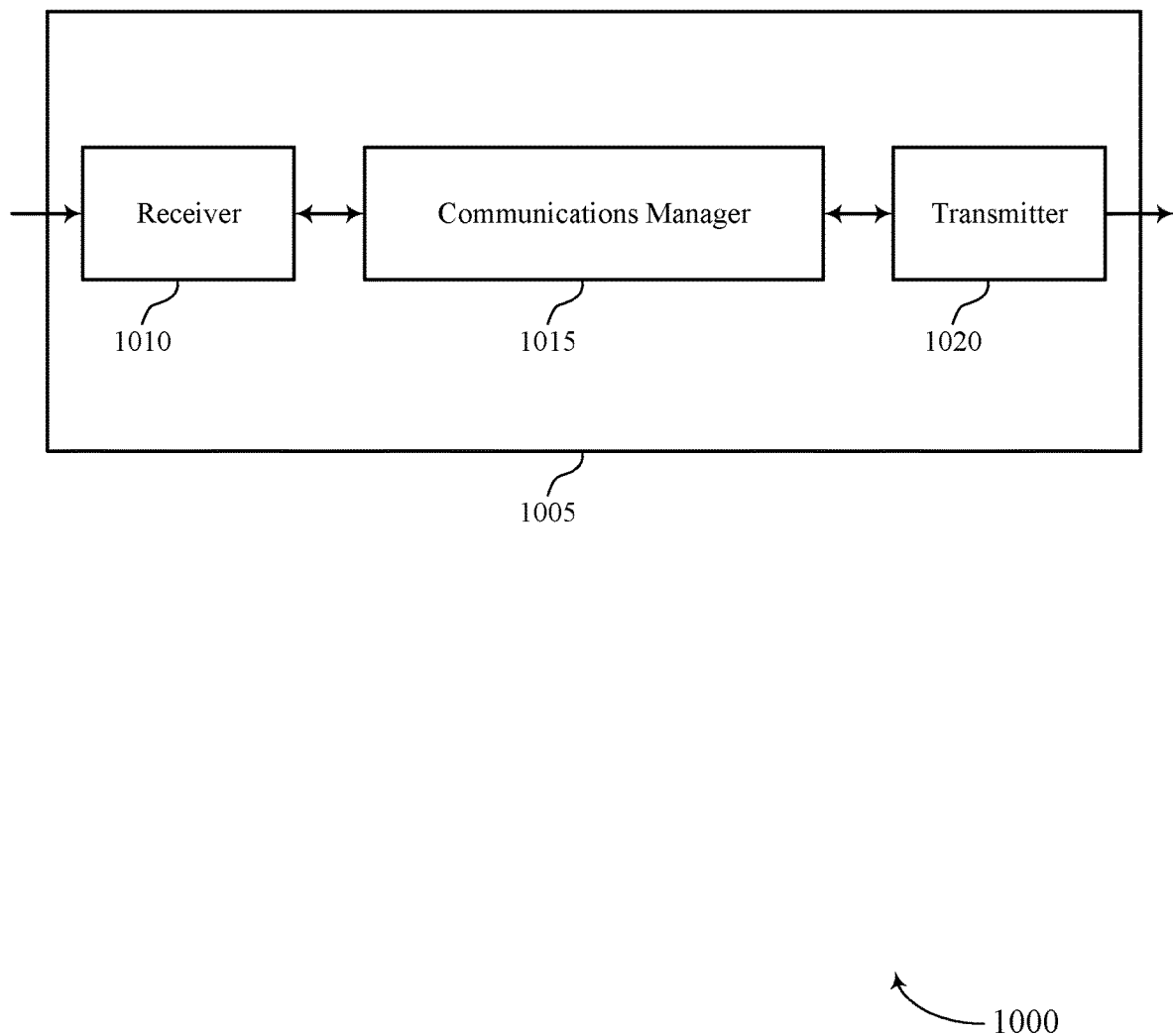
FIGS. 10 and 11 show block diagrams of devices that support mobility for coverage extension modes in wireless communications in accordance with aspects of the present disclosure.

FIG. 10 shows a block diagram 1000 of a device 1005 that supports mobility for coverage extension modes in wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to mobility for coverage extension modes in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a first connection with a UE, the first connection being a CE mode connection or a non-CE mode connection, identify a first subset of neighboring base stations in the first PLMN available for establishing a second connection with the UE, and a second subset of neighboring base stations outside of the first PLMN available for establishing the second connection with the UE, and transmit, to the UE, information associated with at least the first subset of neighboring base stations for use in establishing the second connection, the information including one or more parameters for establishing the second connection in the CE mode or in a non-CE mode. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
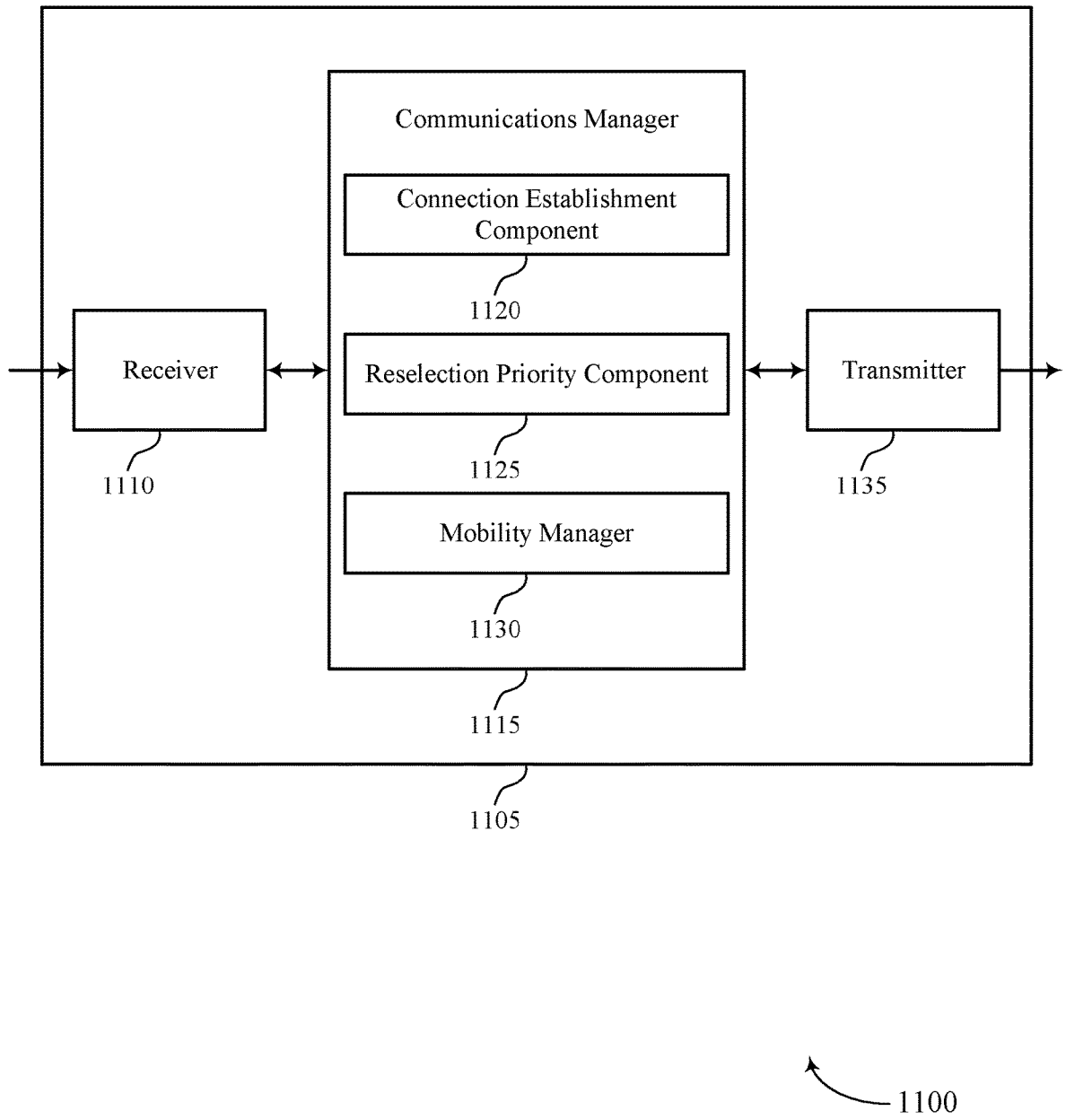

FIG. 11 shows a block diagram 1100 of a device 1105 that supports mobility for coverage extension modes in wireless communications in accordance with aspects of the present disclosure. The device 1105 may be an example of aspects of a device 1005 or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to mobility for coverage extension modes in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a connection establishment component 1120, a reselection priority component 1125, and a mobility manager 1130. The communications manager 1115 may be an example of aspects of the communications manager 1310 described herein.

The connection establishment component 1120 may establish a first connection with a UE, the first connection being a CE mode connection or a non-CE mode connection.

The reselection priority component 1125 may identify a first subset of base stations in the first PLMN available for establishing a second connection with the UE, and a second subset of neighboring base stations outside of the first PLMN available for establishing the second connection with the UE.

The mobility manager 1130 may transmit, to the UE, information associated with at least the first subset of neighboring base stations for use in establishing the second connection, the information including one or more parameters for establishing the second connection in the CE mode or in a non-CE mode.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
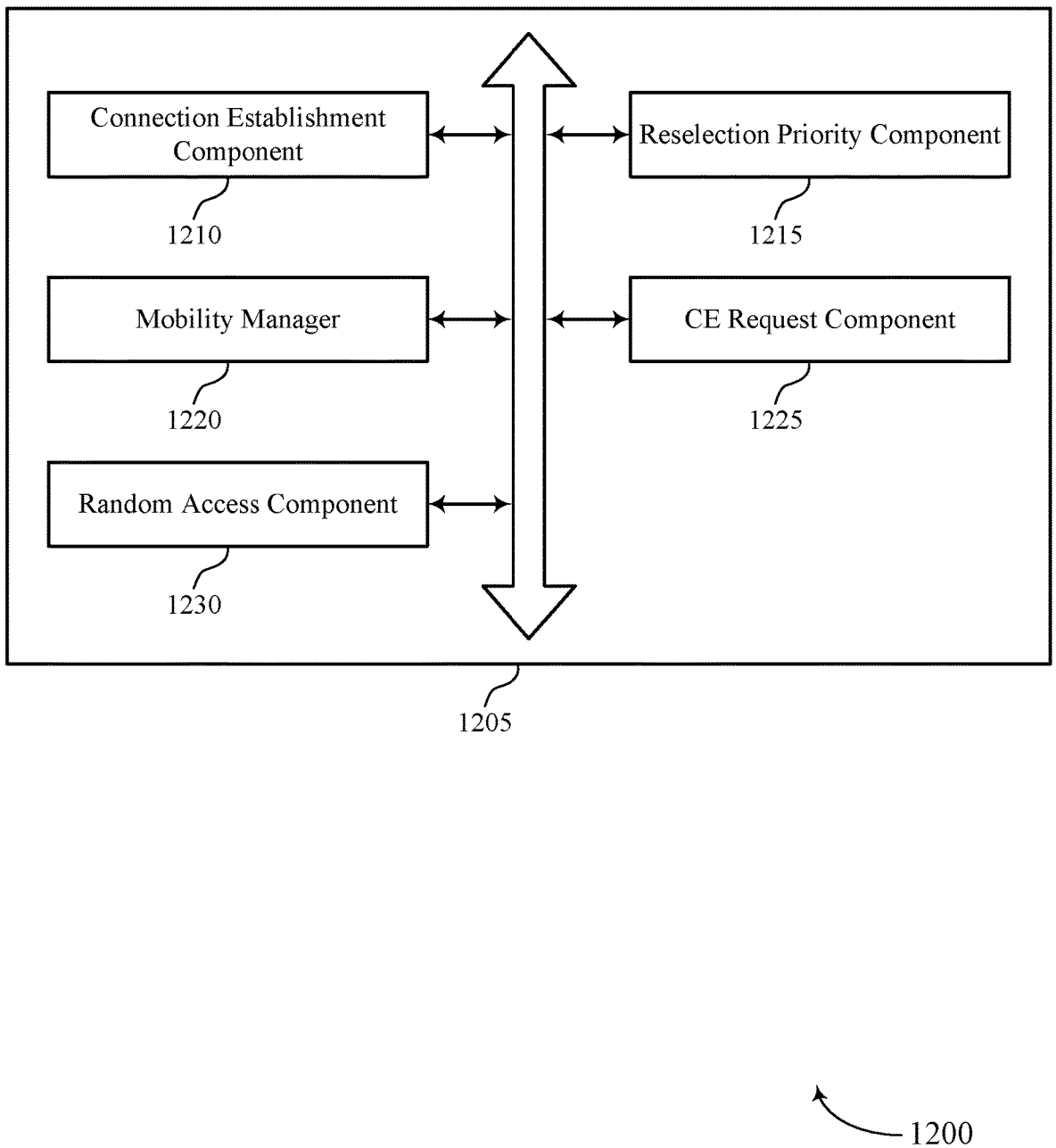
FIG. 12 shows a block diagram of a communications manager that supports mobility for coverage extension modes in wireless communications in accordance with aspects of the present disclosure.

FIG. 12 shows a block diagram 1200 of a communications manager 1205 that supports mobility for coverage extension modes in wireless communications in accordance with aspects of the present disclosure. The communications manager 1205 may be an example of aspects of a communications manager 1015, a communications manager 1115, or a communications manager 1310 described herein. The communications manager 1205 may include a connection establishment component 1210, a reselection priority component 1215, a mobility manager 1220, a CE request component 1225, and a random access component 1230. Each of these modules may communicate, directly or indirectly, with one another (e.g., via one or more buses).

The connection establishment component 1210 may establish a first connection with a UE, the first connection being a coverage extension (CE) mode connection or a non-CE mode connection.

The reselection priority component 1215 may identify a first subset of neighboring base stations in the first PLMN available for establishing a second connection with the UE, and a second subset of neighboring base stations outside of the first PLMN available for establishing the second connection with the UE. In some cases, the information associated with the first subset of neighboring base stations further includes a cell reselection priority frequency, and where the one or more cell IDs have selection priority over cell IDs of base stations of the second subset of neighboring base stations that are within the cell reselection priority frequency.

The mobility manager 1220 may transmit, to the UE, information associated with at least the first subset of neighboring base stations for use in establishing the second connection, the information including one or more parameters for establishing the second connection in the CE mode or in a non-CE mode. In some cases, the information associated with the first subset of neighboring base stations includes one or more cell identifications (IDs) of the first subset of neighboring base stations that have selection priority over the second subset of neighboring base stations. In some cases, the information associated with at least the first subset of neighboring base stations is transmitted in a SIB or in RRC signaling.

The CE request component 1225 may receive, from a second UE, a CE request that broadcast transmissions of the first base station to be transmitted in the CE mode. In some examples, the CE request component 1225 may determine that the second UE is in the first PLMN. In some examples, the CE request component 1225 may transmit, responsive to the determining, a CE response to the second UE that indicates that broadcast transmissions will be transmitted in CE mode. In some cases, the information associated with the first subset of neighboring base stations includes a CE request resource for requesting broadcast transmissions of one or more of the first subset of neighboring base stations to be transmitted in a CE mode. In some cases, the CE request resource is a first CE request resource for the first subset of neighboring base stations that is different than a second CE request resource for the second subset of neighboring base stations.

The random access component 1230 may configure random access resources and preambles. In some cases, the information associated with at least the first subset of neighboring base stations indicates one or more parameters to enable a contention-based random access request from the UE to a second base station of the first subset of neighboring base stations. In some cases, the information associated with at least the first subset of neighboring base stations further indicates extended PRACH resources of the second base station that are configured for CE mode random access requests. In some cases, the information associated with at least the first subset of neighboring base stations further indicates a CE request resource of the second base station.

Figure 13:
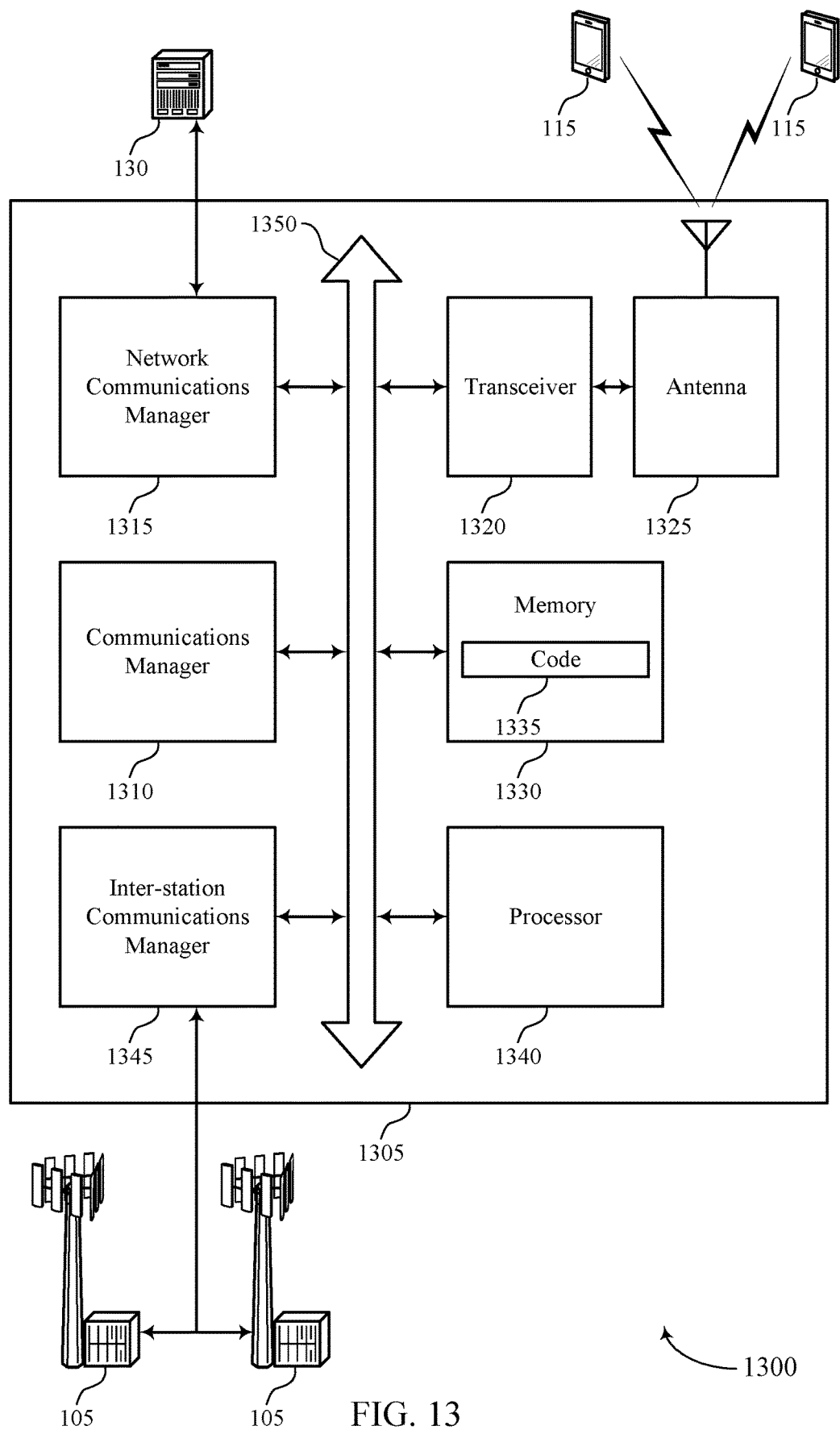
FIG. 13 shows a diagram of a system including a device that supports mobility for coverage extension modes in wireless communications in accordance with aspects of the present disclosure.

FIG. 13 shows a diagram of a system 1300 including a device 1305 that supports mobility for coverage extension modes in wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish a first connection with a UE, the first connection being a CE mode connection or a non-CE mode connection, identify a first subset of neighboring base stations in the first PLMN available for establishing a second connection with the UE, and a second subset of neighboring base stations outside of the first PLMN available for establishing the second connection with the UE, and transmit, to the UE, information associated with at least the first subset of neighboring base stations for use in establishing the second connection, the information including one or more parameters for establishing the second connection in the CE mode or in a non-CE mode.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable, computer-executable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting mobility for coverage extension modes in wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
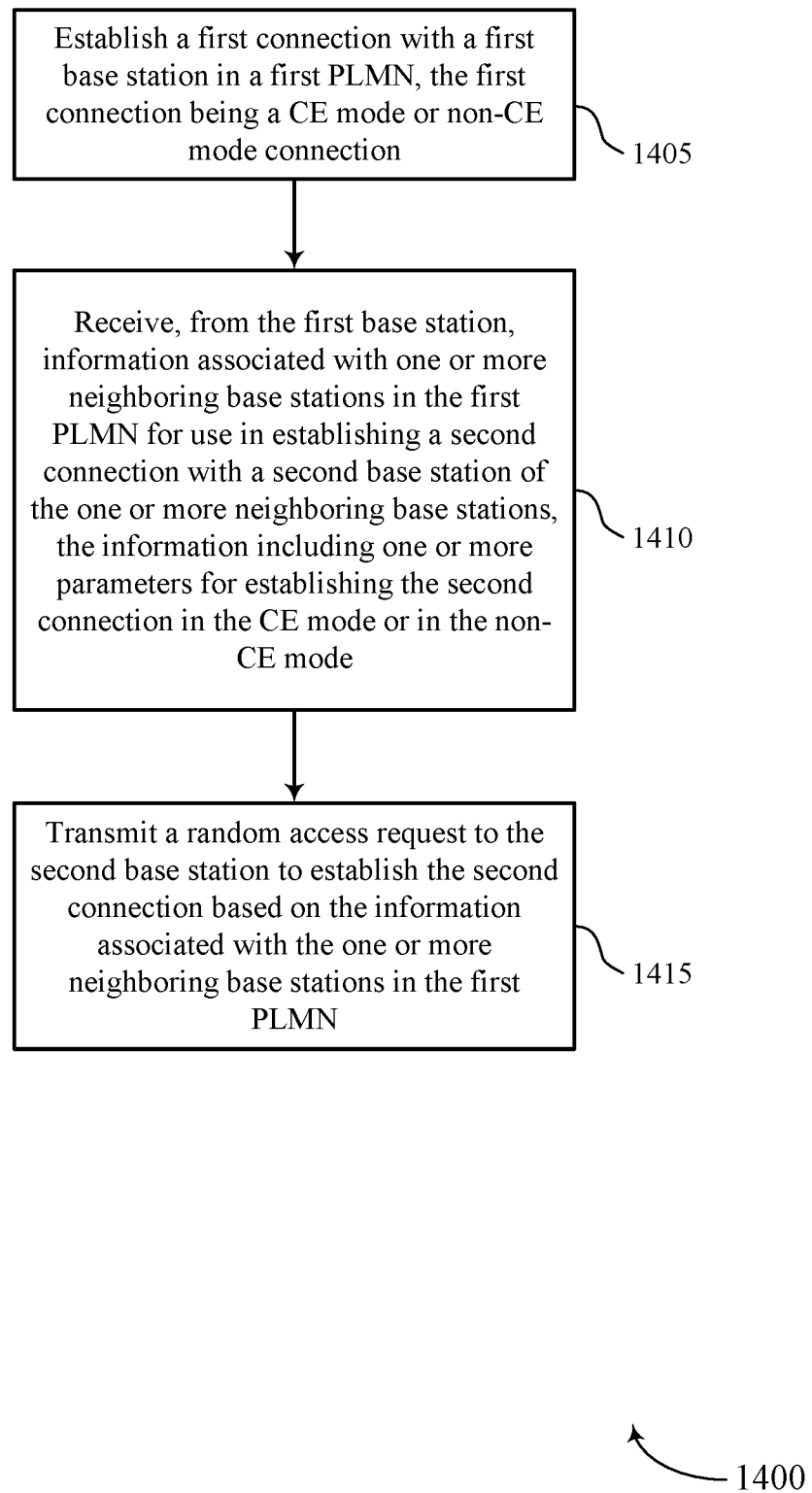
FIGS. 14 through 18 show flowcharts illustrating methods that support mobility for coverage extension modes in wireless communications in accordance with aspects of the present disclosure.

FIG. 14 shows a flowchart illustrating a method 1400 that supports mobility for coverage extension modes in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish a first connection with a first base station in a first PLMN, the first connection being a CE mode connection or a non-CE mode connection. The operations of 1405 may be performed according to the methods described herein. In some examples, aspects of the operations of 1405 may be performed by a connection establishment component as described with reference to FIGS. 6 through 9.

At 1410, the UE may receive, from the first base station, information associated with one or more neighboring base stations in the first PLMN for use in establishing a second connection with a second base station of the one or more neighboring base stations, the information including one or more parameters for establishing the second connection in the CE mode or in the non-CE mode. The operations of 1410 may be performed according to the methods described herein. In some examples, aspects of the operations of 1410 may be performed by a mobility manager as described with reference to FIGS. 6 through 9.

At 1415, the UE may transmit a random access request to the second base station to establish the second connection based on the information associated with the one or more neighboring base stations in the first PLMN. The operations of 1415 may be performed according to the methods described herein. In some examples, aspects of the operations of 1415 may be performed by a random access component as described with reference to FIGS. 6 through 9.

Figure 15:
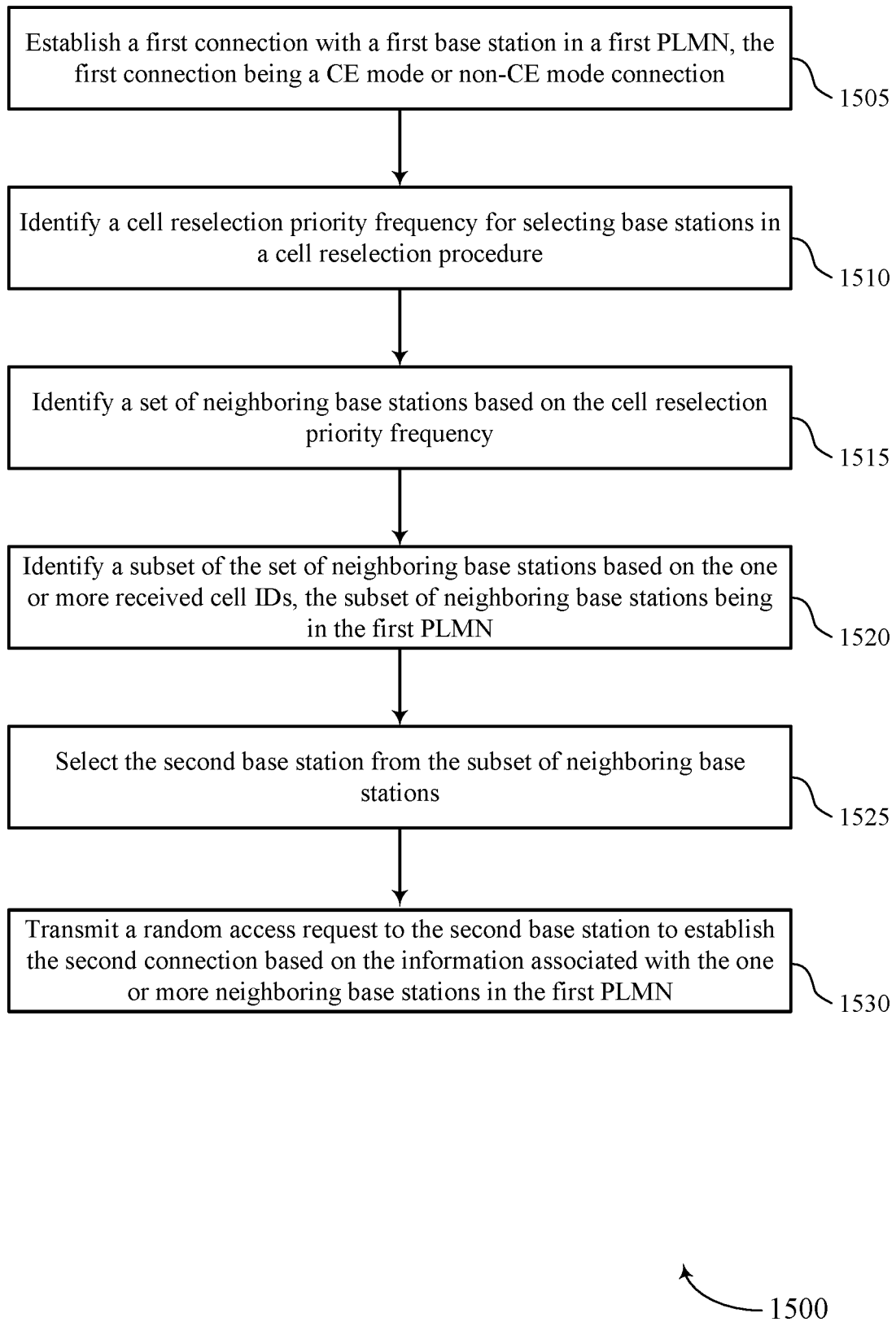

FIG. 15 shows a flowchart illustrating a method 1500 that supports mobility for coverage extension modes in wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish a first connection with a first base station in a first PLMN, the first connection being a CE mode connection or a non-CE mode connection. The operations of 1505 may be performed according to the methods described herein. In some examples, aspects of the operations of 1505 may be performed by a connection establishment component as described with reference to FIGS. 6 through 9.

At 1510, the UE may identify a cell reselection priority frequency for selecting base stations in a cell reselection procedure. The operations of 1510 may be performed according to the methods described herein. In some examples, aspects of the operations of 1510 may be performed by a reselection priority component as described with reference to FIGS. 6 through 9.

At 1515, the UE may identify a set of neighboring base stations based on the cell reselection priority frequency. The operations of 1515 may be performed according to the methods described herein. In some examples, aspects of the operations of 1515 may be performed by a reselection priority component as described with reference to FIGS. 6 through 9.

At 1520, the UE may identify a subset of the set of neighboring base stations based on the one or more received cell IDs, the subset of neighboring base stations being in the first PLMN. The operations of 1520 may be performed according to the methods described herein. In some examples, aspects of the operations of 1520 may be performed by a reselection priority component as described with reference to FIGS. 6 through 9.

At 1525, the UE may select the second base station from the subset of neighboring base stations. The operations of 1525 may be performed according to the methods described herein. In some examples, aspects of the operations of 1525 may be performed by a reselection priority component as described with reference to FIGS. 6 through 9.

At 1530, the UE may transmit a random access request to the second base station to establish the second connection based on the information associated with the one or more neighboring base stations in the first PLMN. The operations of 1530 may be performed according to the methods described herein. In some examples, aspects of the operations of 1530 may be performed by a random access component as described with reference to FIGS. 6 through 9.

Figure 16:
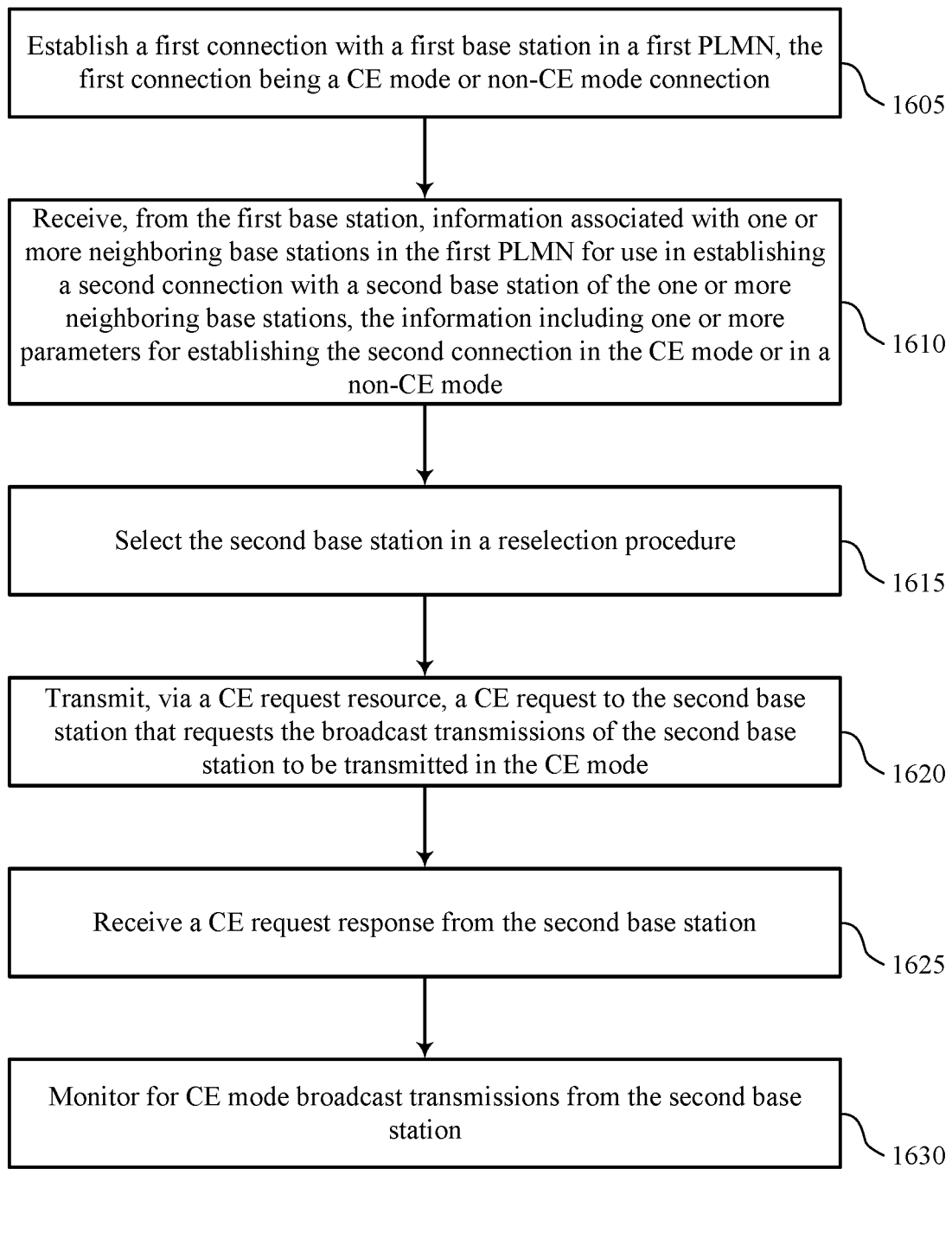

FIG. 16 shows a flowchart illustrating a method 1600 that supports mobility for coverage extension modes in wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may establish a first connection with a first base station in a first PLMN, the first connection being a CE mode connection or a non-CE mode connection. The operations of 1605 may be performed according to the methods described herein. In some examples, aspects of the operations of 1605 may be performed by a connection establishment component as described with reference to FIGS. 6 through 9.

At 1610, the UE may receive, from the first base station, information associated with one or more neighboring base stations in the first PLMN for use in establishing a second connection with a second base station of the one or more neighboring base stations, the information including one or more parameters for establishing the second connection in the CE mode or in a non-CE mode. The operations of 1610 may be performed according to the methods described herein. In some examples, aspects of the operations of 1610 may be performed by a mobility manager as described with reference to FIGS. 6 through 9.

At 1615, the UE may select the second base station in a reselection procedure. The operations of 1615 may be performed according to the methods described herein. In some examples, aspects of the operations of 1615 may be performed by a CE request component as described with reference to FIGS. 6 through 9.

At 1620, the UE may transmit, via an indicated CE request resource, a CE request to the second base station that requests the broadcast transmissions of the second base station to be transmitted in the CE mode. The operations of 1620 may be performed according to the methods described herein. In some examples, aspects of the operations of 1620 may be performed by a CE request component as described with reference to FIGS. 6 through 9.

At 1625, the UE may receive a CE request response from the second base station. The operations of 1625 may be performed according to the methods described herein. In some examples, aspects of the operations of 1625 may be performed by a CE request component as described with reference to FIGS. 6 through 9.

At 1630, the UE may monitor for CE mode broadcast transmissions from the second base station. The operations of 1630 may be performed according to the methods described herein. In some examples, aspects of the operations of 1630 may be performed by a CE request component as described with reference to FIGS. 6 through 9.

Figure 17:
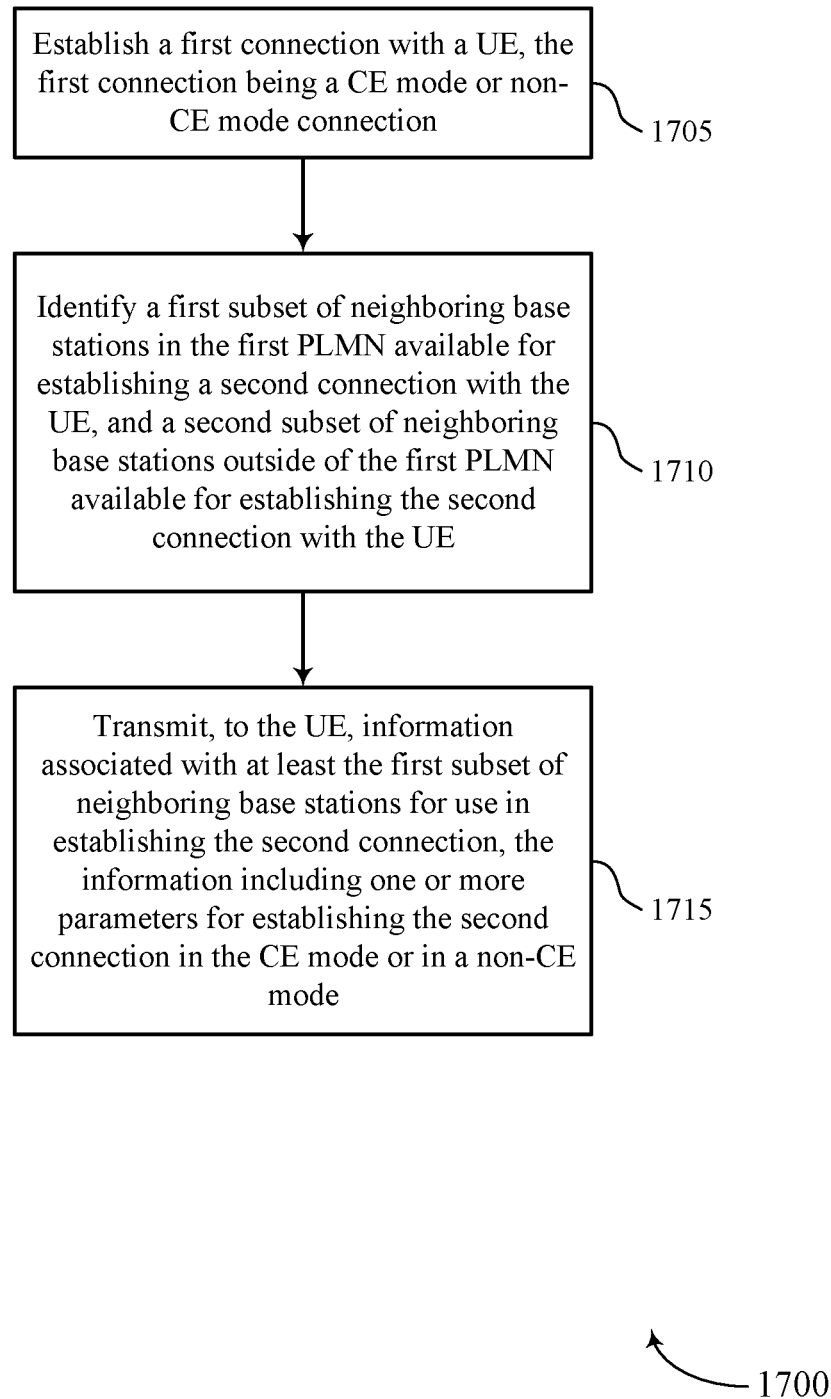

FIG. 17 shows a flowchart illustrating a method 1700 that supports mobility for coverage extension modes in wireless communications in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may establish a first connection with a UE, the first connection being a CE mode connection or a non-CE mode connection. The operations of 1705 may be performed according to the methods described herein. In some examples, aspects of the operations of 1705 may be performed by a connection establishment component as described with reference to FIGS. 10 through 13.

At 1710, the base station may identify a first subset of neighboring base stations in the first PLMN available for establishing a second connection with the UE, and a second subset of neighboring base stations outside of the first PLMN available for establishing the second connection with the UE. The operations of 1710 may be performed according to the methods described herein. In some examples, aspects of the operations of 1710 may be performed by a reselection priority component as described with reference to FIGS. 10 through 13.

At 1715, the base station may transmit, to the UE, information associated with at least the first subset of neighboring base stations for use in establishing the second connection, the information including one or more parameters for establishing the second connection in the CE mode or in a non-CE mode. The operations of 1715 may be performed according to the methods described herein. In some examples, aspects of the operations of 1715 may be performed by a mobility manager as described with reference to FIGS. 10 through 13.

Figure 18:
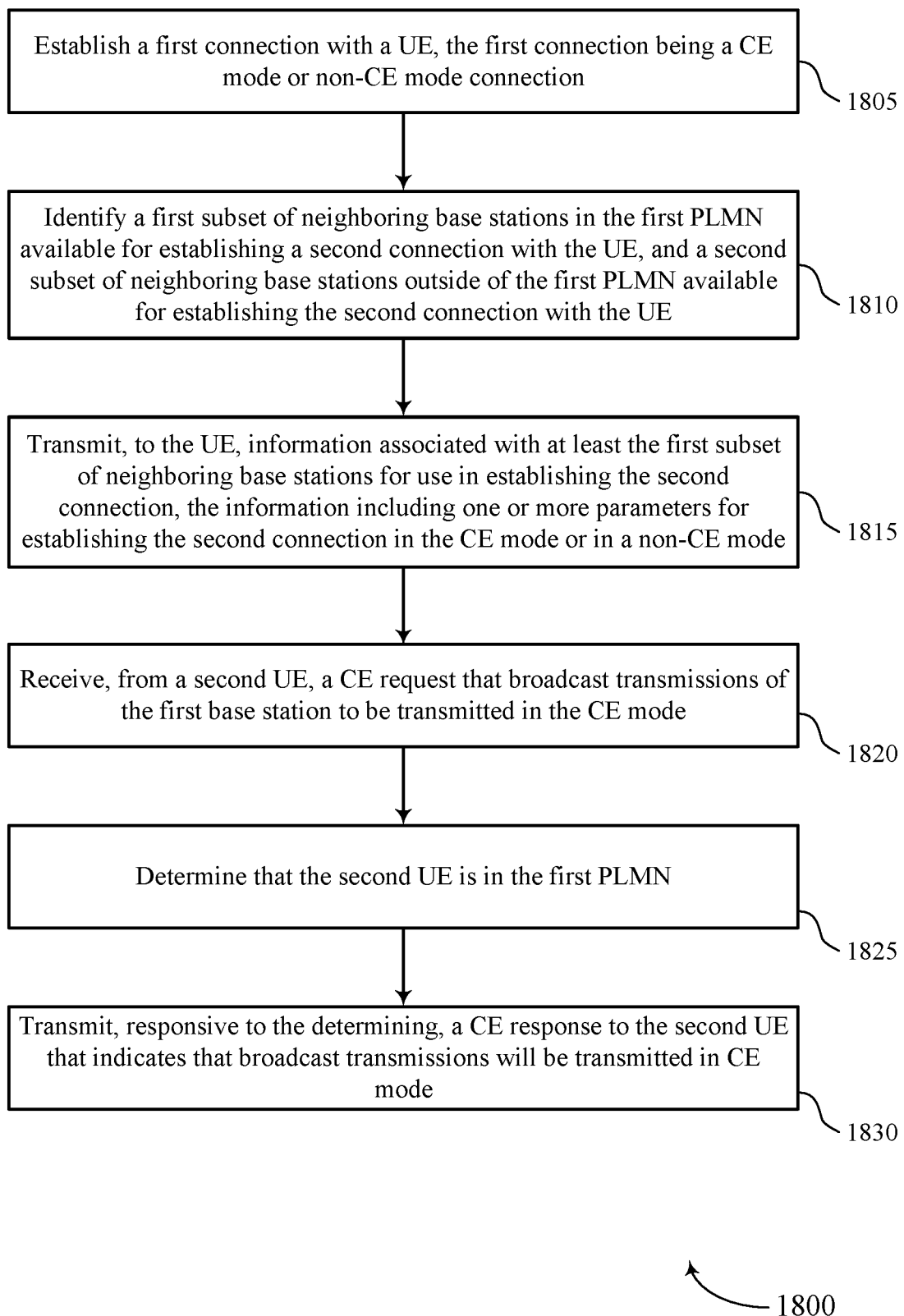

FIG. 18 shows a flowchart illustrating a method 1800 that supports mobility for coverage extension modes in wireless communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may establish a first connection with a UE, the first connection being a CE mode connection or a non-CE mode connection. The operations of 1805 may be performed according to the methods described herein. In some examples, aspects of the operations of 1805 may be performed by a connection establishment component as described with reference to FIGS. 10 through 13.

At 1810, the base station may identify a first subset of neighboring base stations in the first PLMN available for establishing a second connection with the UE, and a second subset of neighboring base stations outside of the first PLMN available for establishing the second connection with the UE. The operations of 1810 may be performed according to the methods described herein. In some examples, aspects of the operations of 1810 may be performed by a reselection priority component as described with reference to FIGS. 10 through 13.

At 1815, the base station may transmit, to the UE, information associated with at least the first subset of neighboring base stations for use in establishing the second connection, the information including one or more parameters for establishing the second connection in the CE mode or in a non-CE mode. The operations of 1815 may be performed according to the methods described herein. In some examples, aspects of the operations of 1815 may be performed by a mobility manager as described with reference to FIGS. 10 through 13. In some cases, the information associated with the first subset of neighboring base stations includes a CE request resource for requesting broadcast transmissions of one or more of the first subset of neighboring base stations to be transmitted in a CE mode.

At 1820, the base station may receive, from a second UE, a CE request that broadcast transmissions of the first base station to be transmitted in the CE mode. The operations of 1820 may be performed according to the methods described herein. In some examples, aspects of the operations of 1820 may be performed by a CE request component as described with reference to FIGS. 10 through 13.

At 1825, the base station may determine that the second UE is in the first PLMN. The operations of 1825 may be performed according to the methods described herein. In some examples, aspects of the operations of 1825 may be performed by a CE request component as described with reference to FIGS. 10 through 13.

At 1830, the base station may transmit, responsive to the determining, a CE response to the second UE that indicates that broadcast transmissions will be transmitted in CE mode. The operations of 1830 may be performed according to the methods described herein. In some examples, aspects of the operations of 1830 may be performed by a CE request component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a first connection with a first base station in a first public mobile land network (PLMN), the first connection being a coverage extension (CE) mode connection or a non-CE mode connection;
    receiving, from the first base station, information associated with one or more neighboring base stations in the first PLMN for use in establishing a second connection with a second base station of the one or more neighboring base stations, the information including one or more parameters for establishing the second connection in a CE mode or in a non-CE mode;

transmitting a CE request to the second base station that requests broadcast transmissions of the second base station be transmitted in the CE mode; and transmitting a random access request to the second base station to establish the second connection based at least in part on the information associated with the one or more neighboring base stations in the first PLMN.

2. The method of claim 1, wherein the information associated with the one or more neighboring base stations in the first PLMN comprises one or more received cell identifications (IDs) that have selection priority over one or more other neighboring base stations outside of the first PLMN.

3. The method of claim 2, further comprising:
identifying a cell reselection priority frequency for selecting base stations in a cell reselection procedure;
identifying a set of neighboring base stations based at least in part on the cell reselection priority frequency;
identifying a subset of the set of neighboring base stations based at least in part on the one or more received cell IDs, the subset of the set of neighboring base stations being in the first PLMN; and
selecting the second base station from the subset of the set of neighboring base stations.

4. The method of claim 1, wherein the information associated with the one or more neighboring base stations in the first PLMN is received in a system information block (SIB) or in radio resource control (RRC) signaling.

5. The method of claim 1, wherein:
the information associated with the one or more neighboring base stations in the first PLMN identifies a CE request resource for transmitting the CE request; and
transmitting the CE request is performed using the CE request resource.

6. The method of claim 5, wherein a CE request resource for the first PLMN is different than other CE request resources of other PLMNs.

7. The method of claim 5, further comprising:
selecting the second base station in a reselection procedure.

8. The method of claim 7, further comprising:
receiving, in response to the CE request, a CE request response from the second base station; and
monitoring for CE mode broadcast transmissions from the second base station.

9. The method of claim 7, further comprising:
determining that a CE request response to the CE request is not received from the second base station within a predetermined time period;
terminating the reselection procedure for the second base station; and
selecting a third base station in the reselection procedure.

10. The method of claim 1, wherein the random access request transmitted to the second base station is a contention-based random access request.

11. The method of claim 10, wherein the contention-based random access request is transmitted via extended physical random access channel (PRACH) resources configured for CE mode random access requests.

12. The method of claim 11, wherein extended PRACH resources are selected for the contention-based random access request based at least in part on a channel quality of the second base station being below a threshold value.

13. The method of claim 10, wherein the information associated with the one or more neighboring base stations identifies a CE request resource for transmitting the CE request, and wherein the transmitting the random access request to the second base station further comprises:
transmitting, prior to transmitting the contention-based random access request, the CE request to the second base station via the CE request resource; and
receiving, responsive to the CE request, an indication of extended physical random access channel (PRACH) resources configured for CE mode random access requests.

14. The method of claim 10, further comprising:
receiving, responsive to the contention-based random access request, a random access response from the second base station; and
transmitting, responsive to the random access response, a cell radio network temporary identifier (C-RNTI) provided by the first base station to indicate to the second base station that the first connection was established with the first base station.

15. A method for wireless communication at a base station in a first public mobile land network (PLMN), comprising:
establishing a first connection with a user equipment (UE), the first connection being a coverage extension (CE) mode connection or a non-CE mode connection;
identifying a first subset of neighboring base stations in the first PLMN available for establishing a second connection with the UE, and a second subset of neighboring base stations outside of the first PLMN available for establishing the second connection with the UE; and
transmitting, to the UE, information associated with at least the first subset of neighboring base stations for use in establishing the second connection, the information including one or more parameters for establishing the second connection in a CE mode or in a non-CE mode and identifying a CE request resource for transmission of a CE request that requests broadcast transmissions of one or more neighboring base stations of the first subset be transmitted in the CE mode.

16. The method of claim 15, wherein the information associated with the first subset of neighboring base stations comprises one or more cell identifications (IDs) of the first subset of neighboring base stations that have selection priority over the second subset of neighboring base stations.

17. The method of claim 16, wherein the information associated with the first subset of neighboring base stations further comprises a cell reselection priority frequency, and wherein the one or more cell IDs of the first subset of neighboring base stations have selection priority over cell IDs of base stations of the second subset of neighboring base stations that are within the cell reselection priority frequency.

18. The method of claim 15, wherein the transmitting comprises transmitting the information associated with at least the first subset of neighboring base stations in a system information block (SIB) or in radio resource control (RRC) signaling.

19. The method of claim 15, wherein a first CE request resource for the first subset of neighboring base stations is different than a second CE request resource for the second subset of neighboring base stations.

20. The method of claim 15, further comprising:
receiving, from a second UE, a CE request that broadcast transmissions of the base station in the first PLMN be transmitted in the CE mode;
determining that the second UE is in the first PLMN; and transmitting, responsive to the determining, a CE response to the second UE that indicates that the broadcast transmissions will be transmitted in the CE mode.

21. The method of claim 15, wherein the information associated with at least the first subset of neighboring base stations indicates one or more parameters to enable a contention-based random access request from the UE to a second base station of the first subset of neighboring base stations.

22. The method of claim 21, wherein the information associated with at least the first subset of neighboring base stations further indicates extended physical random access channel (PRACH) resources of the second base station that are configured for CE mode random access requests.

23. The method of claim 21, wherein the information associated with at least the first subset of neighboring base stations further indicates a CE request resource of the second base station.

24. An apparatus for wireless communication at a user equipment (UE), comprising:
a processor,
memory coupled with the processor; and
instructions stored in the memory and executable by the processor to cause the apparatus to:
establish a first connection with a first base station in a first public mobile land network (PLMN), the first connection being a coverage extension (CE) mode connection or a non-CE mode connection;
receive, from the first base station, information associated with one or more neighboring base stations in the first PLMN for use in establishing a second connection with a second base station of the one or more neighboring base stations, the information including one or more parameters for establishing the second connection in a CE mode or in a non-CE mode;
transmit a CE request to the second base station that requests broadcast transmissions of the second base station be transmitted in the CE mode; and
transmit a random access request to the second base station to establish the second connection based at least in part on the information associated with the one or more neighboring base stations in the first PLMN.

25. The apparatus of claim 24, wherein the information associated with the one or more neighboring base stations in the first PLMN comprises one or more received cell identifications (IDs) that have selection priority over one or more other neighboring base stations outside of the first PLMN.

26. The apparatus of claim 25, wherein the instructions are further executable by the processor to cause the apparatus to:
identify a cell reselection priority frequency for selecting base stations in a cell reselection procedure;
identify a set of neighboring base stations based at least in part on the cell reselection priority frequency;
identify a subset of the set of neighboring base stations based at least in part on the one or more received cell IDs, the subset of the set of neighboring base stations being in the first PLMN; and
select the second base station from the subset of the set of neighboring base stations.

27. The apparatus of claim 24, wherein:
the information associated with the one or more neighboring base stations in the first PLMN identifies a CE request resource for transmitting the CE request; and
transmitting the CE request is performed using the CE request resource.

28. The apparatus of claim 27, wherein a first CE request resource for the first PLMN is different than other CE request resources for other PLMNs.

29. The apparatus of claim 27, wherein the instructions are further executable by the processor to cause the apparatus to:
select the second base station in a reselection procedure.

30. The apparatus of claim 29, wherein the instructions are further executable by the processor to cause the apparatus to:
receive a CE request response from the second base station; and
monitor for CE mode broadcast transmissions from the second base station.

31. The apparatus of claim 29, wherein the instructions are further executable by the processor to cause the apparatus to:
determine that a CE request response is not received from the second base station within a predetermined time period;
terminate the reselection procedure for the second base station; and
select a third base station in the reselection procedure.

32. The apparatus of claim 24, wherein the random access request transmitted to the second base station is a contention-based random access request.

33. An apparatus for wireless communication at a base station in a first public mobile land network (PLMN), comprising:
a processor,
memory coupled with the processor; and
instructions stored in the memory and executable by the processor to cause the apparatus to:
establish a first connection with a user equipment (UE), the first connection being a coverage extension (CE) mode connection or a non-CE mode connection;
identify a first subset of neighboring base stations in the first PLMN available for establishing a second connection with the UE, and a second subset of neighboring base stations outside of the first PLMN available for establishing the second connection with the UE; and
transmit, to the UE, information associated with at least the first subset of neighboring base stations for use in establishing the second connection, the information including one or more parameters for establishing the second connection in a CE mode or in a non-CE mode and identifying a CE request resource for transmission of a CE request that requests broadcast transmissions of one or more neighboring base stations of the first subset be transmitted in the CE mode.

34. The apparatus of claim 33, wherein the information associated with the first subset of neighboring base stations comprises one or more cell identifications (IDs) of the first subset of neighboring base stations that have selection priority over the second subset of neighboring base stations.

35. The apparatus of claim 34, wherein the information associated with the first subset of neighboring base stations further comprises a cell reselection priority frequency, and wherein the one or more cell IDs of the first subset of neighboring base stations have selection priority over cell IDs of base stations of the second subset of neighboring base stations that are within the cell reselection priority frequency.

36. The apparatus of claim 33, wherein the information associated with at least the first subset of neighboring base stations indicates one or more parameters to enable a contention-based random access request from the UE to a second base station of the first subset of neighboring base stations.

37. The apparatus of claim 33, wherein a first CE request resource for the first subset of neighboring base stations is different than a second CE request resource for the second subset of neighboring base stations.

38. An apparatus for wireless communication at a user equipment (UE), comprising:
  means for establishing a first connection with a first base station in a first public mobile land network (PLMN), the first connection being a coverage extension (CE) mode connection or a non-CE mode connection;
  means for receiving, from the first base station, information associated with one or more neighboring base stations in the first PLMN for use in establishing a second connection with a second base station of the one or more neighboring base stations, the information including one or more parameters for establishing the second connection in a CE mode or in a non-CE mode;
  means for transmitting a CE request to the second base station that requests broadcast transmissions of the second base station be transmitted in the CE mode; and
  means for transmitting a random access request to the second base station to establish the second connection based at least in part on the information associated with the one or more neighboring base stations in the first PLMN.

39. The apparatus of claim 38, further comprising:
  means for identifying a cell reselection priority frequency for selecting base stations in a cell reselection procedure;
  means for identifying a set of neighboring base stations based at least in part on the cell reselection priority frequency;
  means for identifying a subset of the set of neighboring base stations based at least in part on one or more received cell IDs, the subset of the set of neighboring base stations being in the first PLMN; and
  means for selecting the second base station from the subset of the set of neighboring base stations.

40. The apparatus of claim 38, wherein:
  the information associated with the one or more neighboring base stations in the first PLMN identifies a CE request resource for transmitting the CE request; and
  transmitting the CE request is performed using the CE request resource.

41. The apparatus of claim 38, wherein the random access request transmitted to the second base station is a contention-based random access request.

42. The apparatus of claim 40, wherein a first CE request resource for the first PLMN is different than other CE request resources for other PLMNs.

43. An apparatus for wireless communication at a base station in a first public mobile land network (PLMN), comprising:
  means for establishing a first connection with a user equipment (UE), the first connection being a coverage extension (CE) mode connection or a non-CE mode connection;
  means for identifying a first subset of neighboring base stations in the first PLMN available for establishing a second connection with the UE, and a second subset of neighboring base stations outside of the first PLMN available for establishing the second connection with the UE; and
  means for transmitting, to the UE, information associated with at least the first subset of neighboring base stations for use in establishing the second connection, the information including one or more parameters for establishing the second connection in a CE mode or in a non-CE mode and identifying a CE request resource for transmission of a CE request that requests broadcast transmissions of one or more neighboring base stations of the first subset be transmitted in the CE mode.

44. The apparatus of claim 43, wherein the information associated with the first subset of neighboring base stations comprises one or more cell identifications (IDs) of the first subset of neighboring base stations that have selection priority over the second subset of neighboring base stations.

45. The apparatus of claim 44, wherein the information associated with the first subset of neighboring base stations further comprises a cell reselection priority frequency, and wherein the one or more cell IDs of the first subset of neighboring base stations have selection priority over cell IDs of base stations of the second subset of neighboring base stations that are within the cell reselection priority frequency.

46. The apparatus of claim 43, wherein the information associated with at least the first subset of neighboring base stations indicates one or more parameters to enable a contention-based random access request from the UE to a second base station of the first subset of neighboring base stations.

47. The apparatus of claim 43, wherein a first CE request resource for the first subset of neighboring base stations is different than a second CE request resource for the second subset of neighboring base stations.

48. A non-transitory computer-readable medium storing code for wireless communication at a user equipment (UE), the code comprising instructions executable by a processor to:
  establish a first connection with a first base station in a first public mobile land network (PLMN), the first connection being a coverage extension (CE) mode connection or a non-CE mode connection;
  receive, from the first base station, information associated with one or more neighboring base stations in the first PLMN for use in establishing a second connection with a second base station of the one or more neighboring base stations, the information including one or more parameters for establishing the second connection in a CE mode or in a non-CE mode;
  transmit a CE request to the second base station that requests broadcast transmissions of the second base station be transmitted in the CE mode; and
  transmit a random access request to the second base station to establish the second connection based at least in part on the information associated with the one or more neighboring base stations in the first PLMN.

49. A non-transitory computer-readable medium storing code for wireless communication at a base station in a first public mobile land network (PLMN), the code comprising instructions executable by a processor to:
  establish a first connection with a user equipment (UE), the first connection being a coverage extension (CE) mode connection or a non-CE mode connection;
  identify a first subset of neighboring base stations in the first PLMN available for establishing a second connection with the UE, and a second subset of neighboring base stations outside of the first PLMN available for establishing the second connection with the UE; and transmit, to the UE, information associated with at least the first subset of neighboring base stations for use in establishing the second connection, the information including one or more parameters for establishing the second connection in a CE mode or in a non-CE mode and identifying a CE request resource for transmission of a CE request that requests broadcast transmissions of one or more neighboring base stations of the first subset be transmitted in the CE mode.

* * * * *